United States Patent [19]

Knowles

[11] Patent Number: 5,083,214
[45] Date of Patent: Jan. 21, 1992

[54] APPARATUS AND METHODS FOR EXTRACTING DATA FROM A SCANNED BIT-MAPPED DATA STRIP

[75] Inventor: Daniel B. Knowles, Rochester, N.Y.

[73] Assignee: Eastman Kodak Company, Rochester, N.Y.

[21] Appl. No.: 517,782

[22] Filed: May 2, 1990

[51] Int. Cl.$^5$ .............................................. H04N 1/00
[52] U.S. Cl. .................................... 358/403; 358/445; 358/447; 358/448; 358/432; 358/433
[58] Field of Search ............... 358/429, 433, 432, 403, 358/445, 447, 465, 466, 448, 140

[56] References Cited

U.S. PATENT DOCUMENTS

| | | |
|---|---|---|
| 3,805,239 | 4/1974 | Watanabe . |
| 3,968,475 | 7/1976 | McMahon . |
| 4,204,230 | 5/1980 | Sprague . |
| 4,218,673 | 8/1980 | Yoshida . |
| 4,278,999 | 7/1981 | Ganguly et al. . |
| 4,547,811 | 10/1985 | Ochi et al. ............................ 358/466 |
| 4,553,171 | 11/1985 | Holladay et al. ..................... 358/433 |
| 4,588,882 | 5/1986 | Buxton . |
| 4,634,850 | 1/1987 | Pierce et al. . |
| 4,652,730 | 3/1987 | Marshall . |
| 4,692,603 | 9/1987 | Brass et al. . |
| 4,695,991 | 9/1987 | Hudson . |
| 4,728,783 | 3/1988 | Brass et al. . |
| 4,754,127 | 6/1988 | Brass et al. . |
| 4,782,221 | 11/1988 | Brass et al. . |
| 4,786,792 | 11/1988 | Pierce et al. . |
| 4,811,321 | 3/1989 | Enari et al. . |
| 4,939,589 | 7/1990 | Fischer et al. ........................ 358/448 |

Primary Examiner—Jin F. Ng
Assistant Examiner—Nader Sayegh
Attorney, Agent, or Firm—Dennis R. Arndt

[57] ABSTRACT

Apparatus, and accompanying methods, for determining appropriate sampling points located throughout a scanned microfilmed bit-mapped "data strip" in order to properly extract the values of stored data bits therefrom. Each data bit is formed of a contiguous group of one or more pixels in the data strip. Specifically, my technique involves parsing the data strip into successive vertical strips that each has successive rows of pixels, determining inter-row and inter-pixel differential intensity values for each vertical strip, and defining vertical line addresses and horizontal pixel addresses in each of the strips as a function of the pixel positions of the inter-row and inter-pixel differential intensity values associated therewith. The individual pixels in each vertical strip, which are situated at the horizontal pixel addresses and which lie on those rows in that vertical strip specified by the vertical line addresses, are sampled in order to yield sampled pixel data. All the sampled pixel data collectively represents the values of the data bits stored in the data strip. Advantageously, the line and pixel addresses will appropriately change in response to skew that occurs between the data strip and a microfilm line scanner as the data strip is being scanned and/or to changes in data bit size that occurs from one data strip to the next.

31 Claims, 11 Drawing Sheets

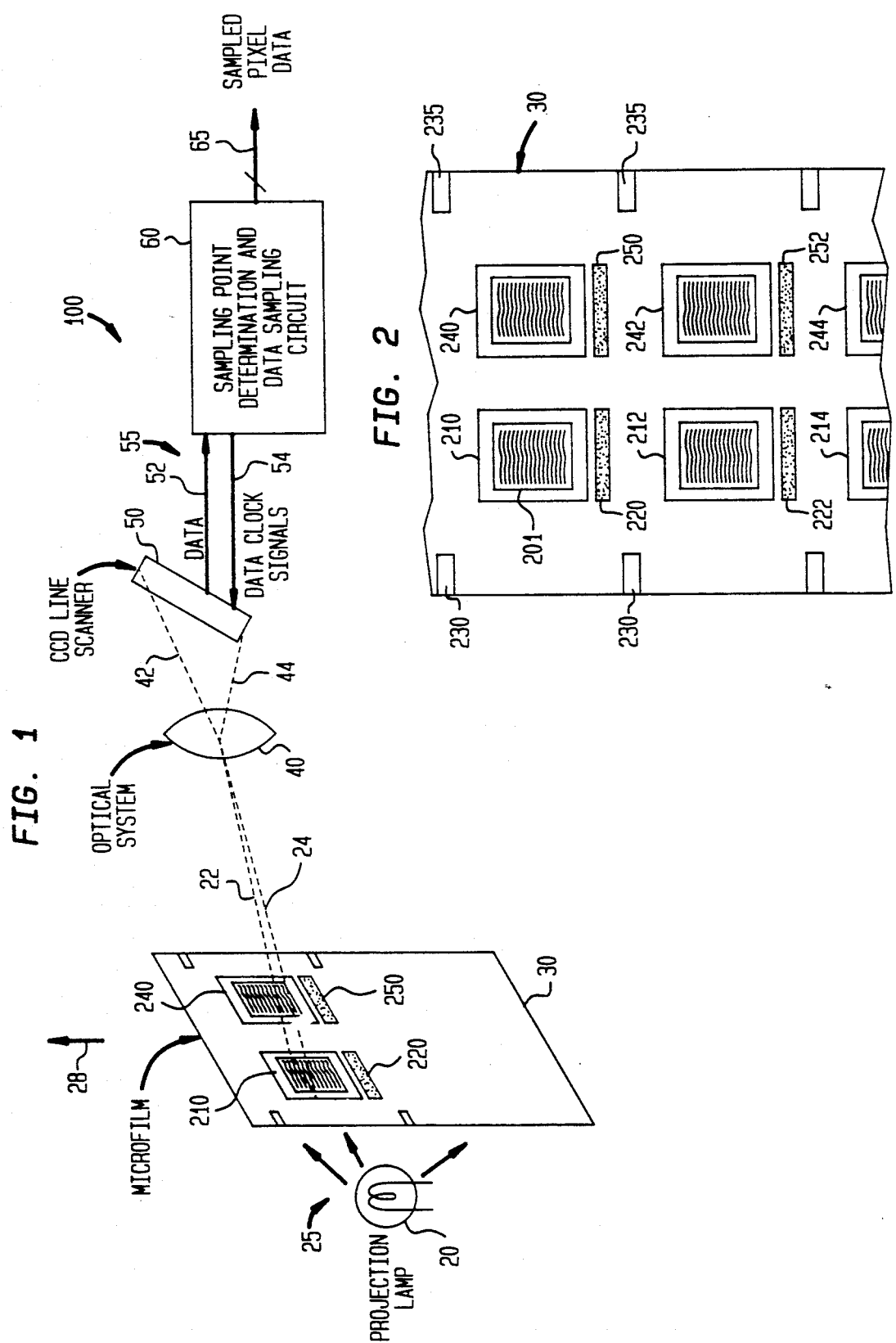

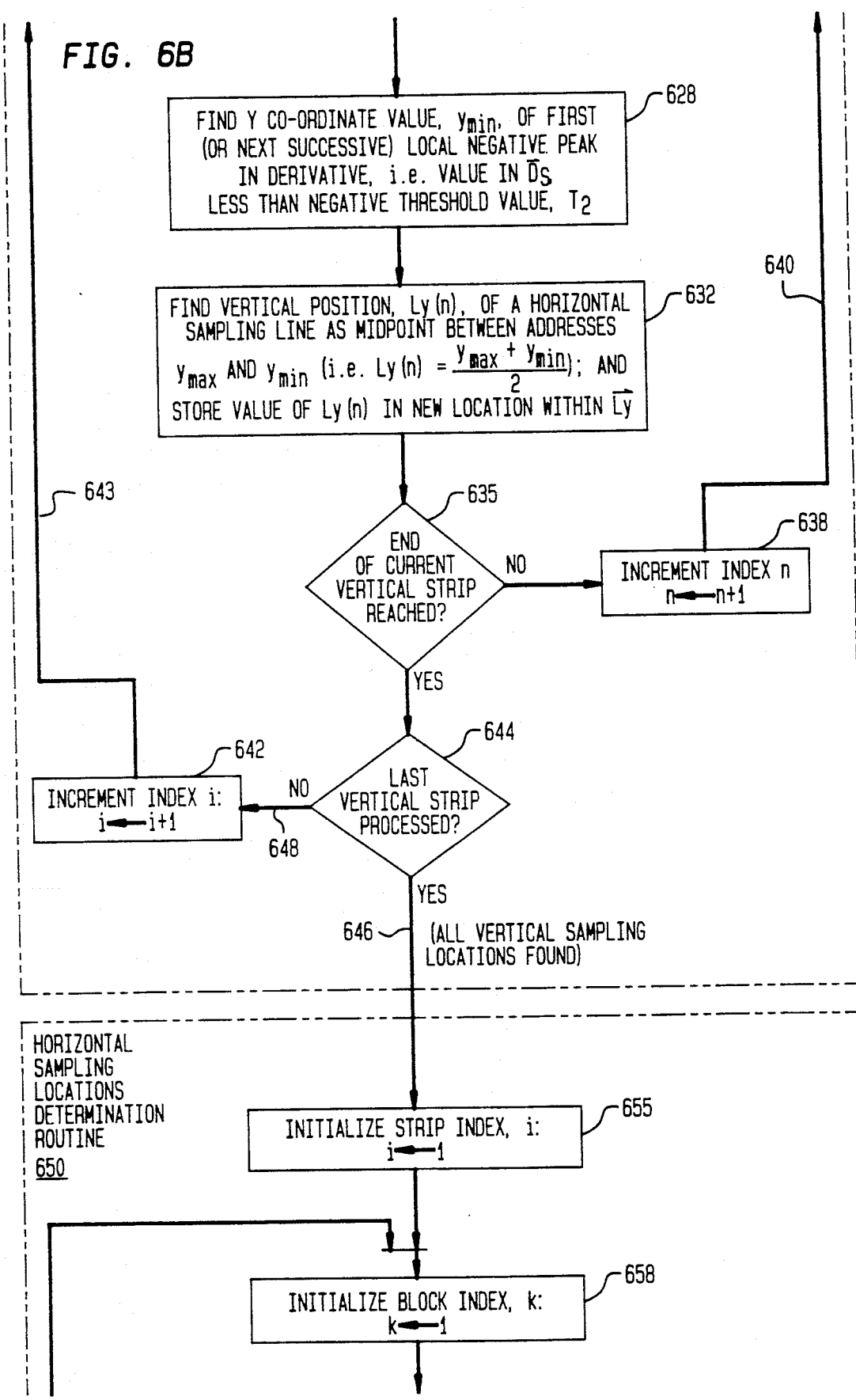

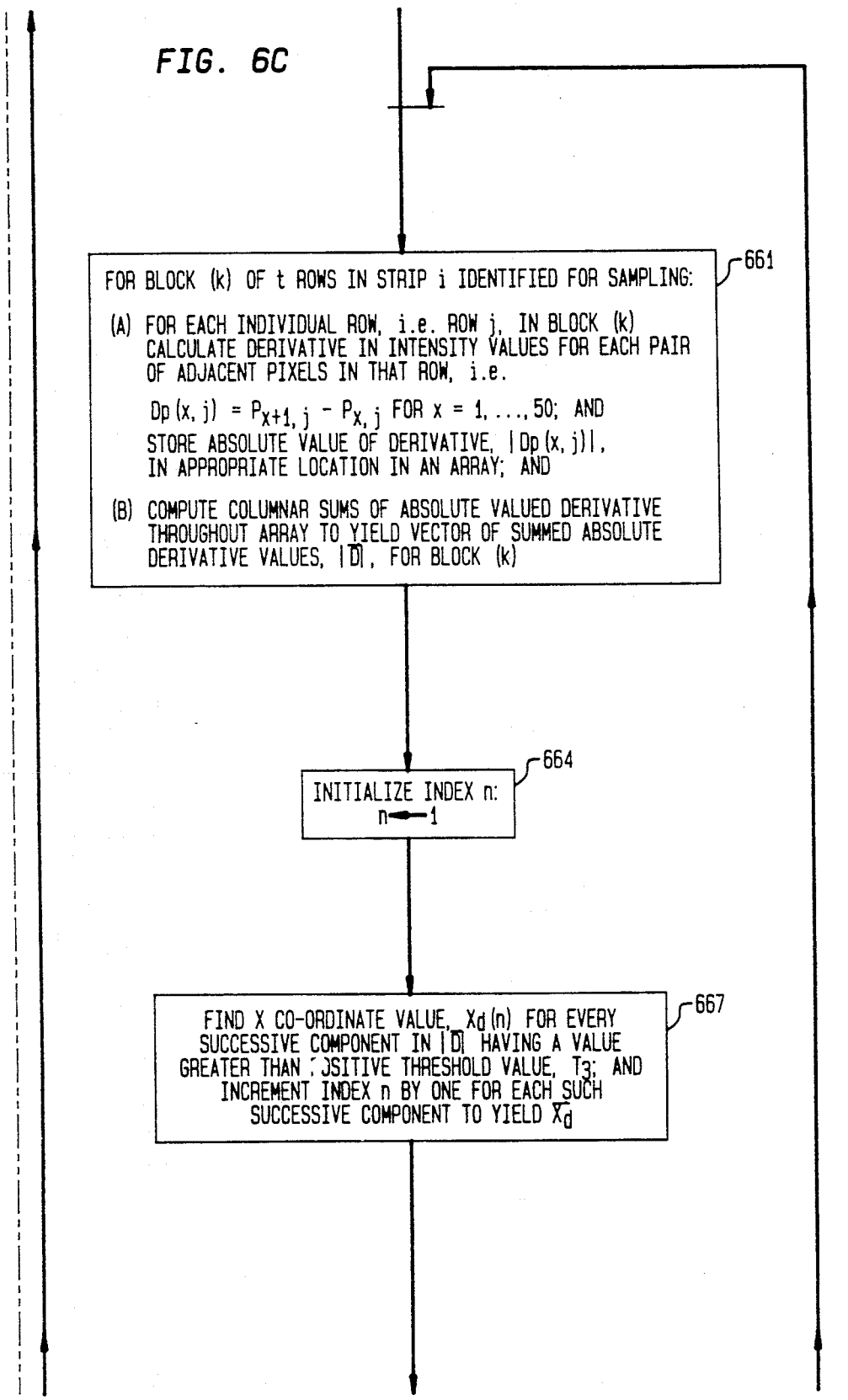

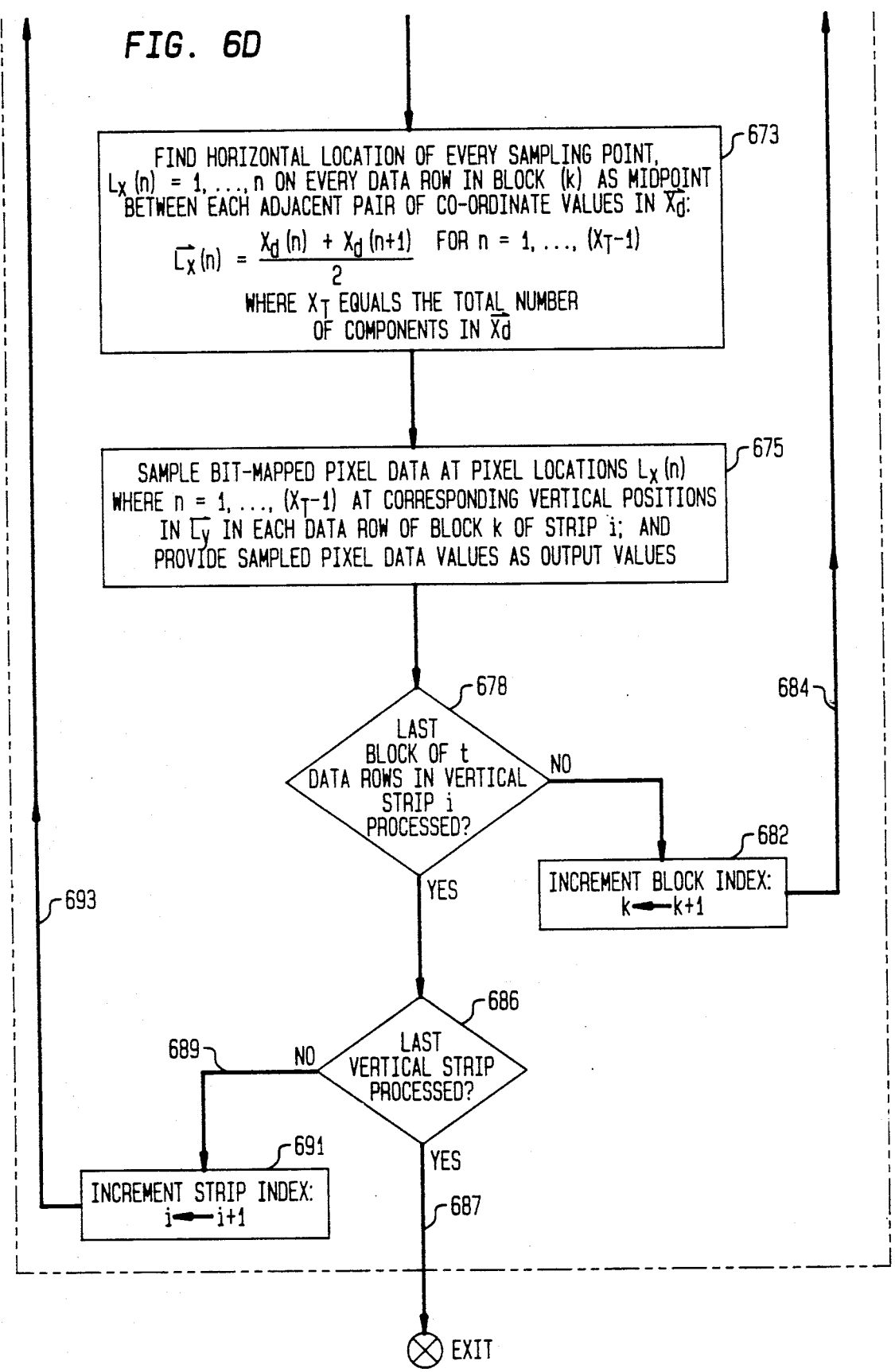

| FIG. 8A | FIG. 8B |

APPARATUS AND METHODS FOR EXTRACTING DATA FROM A SCANNED BIT-MAPPED DATA STRIP

TECHNICAL FIELD OF THE INVENTION

The invention relates to apparatus, and accompanying methods, for determining appropriate sampling points located throughout a scanned microfilmed bit-mapped image, particularly a microfilm "data strip", in order to properly extract data therefrom.

BACKGROUND ART

Over the past few years, microfilm has seen increasing use as a medium of choice for compactly storing extremely large amounts of documentary information. Conventionally, this form of storage relies on photographically reducing the size of a page of a document by a substantial amount and then capturing an image of the reduced page on a corresponding frame of microfilm. Each such photographed page may depict a page in an individual business record, such as a completed business form or the like. Microfilm itself generally takes the form of a rolled transparent strip of developed film that typically contains thousands of successive substantially reduced images.

A microfilm image of a document rarely, if ever, exists by itself utterly devoid of identifying data. On the one hand, this data, in a manual microfilm retrieval system, consists of sufficient human readable text that identifies the range of images stored on that entire roll, e.g. issues of *The New York Times* for the years 1988-1990 or U.S. Pat. Nos. 4,955,000 through 4,958,000. This information is generally situated on an outer surface of a case for the roll. Unfortunately, the very limited space on the roll case often precludes the inclusion of any, let alone sufficient, text to describe each individual image in that roll. On the other hand, in an automated image management system, image identifying information would typically be stored on magnetic media in a user searchable computer database connected to an automated film library. Here, this information might consist of illustratively microfilm roll and frame numbers along with suitable pre-defined identifying criteria, such as various keywords or the like, that describes each stored microfilm image accessible through the system. Unfortunately, an automated image management system is frequently too expensive for use in many small and intermediate-sized microfilm based image storage applications.

Furthermore, microfilm has the inherent advantage that it does not deteriorate with time as quickly as does magnetic media. After several years of remaining in a static condition, magnetic media tends to rapidly deteriorate by experiencing drop-outs and/or other similar artifacts that adversely affect the integrity of data stored thereon. However, microfilm generally deteriorates much more slowly than magnetic media and therefore provides substantially greater long term data integrity than does magnetic media.

With the above considerations in mind, an overall need has arisen in the art to be able to store a reasonable, though limited, amount of digital data on microfilm co-extensively with a human readable image appearing thereon. By doing so, a significant amount of identifying information could be included with each microfilm image without, in many instances, the necessity to store this information in a computer and specifically in magnetic media associated therewith. As a result, a relatively low cost microfilm retrieval system could be constructed which would still provide significant amounts of identifying information for each stored image, clearly substantially more than that which would be available with a manual microfilm retrieval system of the type described above. Specifically, the information would be specific to the image and be read while the image is being scanned. This information could, for example, include identifying indicia for an associated image. Alternatively, if the image is a page of a microfilmed form, this data could be textual data that results from optically reading and digitizing various pre-defined fields in this page. This data, being stored in digital form, could easily be read into a computer for subsequent data processing as a result of the same scanning pass during which the image itself is being scanned and digitized for subsequent image processing. Alternatively, this data could merely be read and locally displayed as text to an operator in order to identify and/or describe a particular microfilm image that is then being displayed.

One technique which is well known in the art for storing digital data on non-magnetic media, such as paper or the like, utilizes so-called "data strips". In essence, a data strip consists of a series of rows of printed bit-mapped data patterns that fills a given two-dimensional rectangular area on a piece of paper. Each row contains a ordered co-lineal arrangement of relatively small essentially square white and black bits that extends across the length of that row. Each bit may occupy several adjacent pixels. The ordering of the bits in each row determines the digital data stored therein. A white bit is associated with one binary state; a black bit is associated with the other binary state. The data collectively stored within all the rows defines the data contained within the entire strip. To read a strip, a user passes a hand scanner or scanning wand, typically employing a line scanner, along one direction, e.g. the horizontal direction, across the strip to simultaneously read a column of pixels that extends vertically throughout the width of the strip. As the conclusion of this pass, all the pixels in all the rows have been scanned a column at a time.

For a fixed size strip, as the size of each bit in this strip decreases, the amount of data contained within each row increases as does the number of rows that can occupy the entire strip. As such, the data capacity of the strip correspondingly increases.

Inasmuch as a data strip can be accurately imprinted on nearly any flat substrate, regardless of whether it is magnetic or not, data strips show great promise in providing an auxiliary on-film digital data store for use in conjunction with human readable microfilm images. To provide sufficient longevity, a data strip for microfilm applications might likely be first printed on paper or a suitable media and then be photographically reduced along with a corresponding page of a document onto microfilm. The reduced image of the strip would be located in the vicinity, typically above or below, the reduced image of the page. In this case, since the documentary page and the strip are both photographically stored within the microfilm, the microfilm would provide the same long term integrity for both the microfilmed strip and the microfilmed document page.

A data strip that would be suitable for use in a microfilm application would likely be quite small. In this regard, each separate pixel would measure approximately 0.08 mills (approximately 2 μm) on each side such that, after magnification, pixels of this size would provide a resolution of approximately 400 dots/inch (approximately 158 dots/centimeter—cm). At this resolution, a bit on the microfilm would be formed of a block of vertically and horizontally adjacent pixels and could consume approximately 9 μm² of film area. With this size, a photographically reduced data strip of approximately 6 mm by 2 mm (approximately 0.24 by 0.08 inches) should be able to hold 50-100 bytes of data in each row and approximately 20 Kbytes in the entire strip, which is sufficient to accommodate approximately 10 pages of ASCII data and more using suitable compression techniques. Accordingly, such a data strip can store a reasonable amount of digital information in a relatively small physical space.

One attempt in the art for providing a data strip, though suited for use with paper media, is described in, for example, U.S. Pat. Nos. 4,782,221 (issued to R. L. Brass et al on Nov. 1, 1988); 4,754,127 (issued to R. L. Brass et al on June 28, 1988) and 4,728,783 (issued to R. L. Brass et al on Mar. 1, 1988). Here, data strips are used to store computer programs and/or data on paper and are scanned by use of a hand scanner or scanning wand. While the strips described in these patents (commonly and hereinafter referred to as "Cauzin" strips) do provide a paper-based digital data store, these strips suffer serious drawbacks which prevents their usage on microfilm media. First, tracking errors, often substantial, can occur between the axial orientation of a hand scanner and the orthogonal rows and columns of bits in a Cauzin strip. As such, in an effort to compensate for these errors, the data recorded in Cauzin strips generally contains strong redundancies as well as embedded synchronization and/or tracking bits (collectively referred to as "clock bits"). Unfortunately, by embedding numerous clock bits directly within each row, the amount of digital data that can be stored within that row significantly decreases thereby seriously and adversely affecting the data capacity of the entire strip. Second, the algorithms that are currently used to extract data from a Cauzin strip greatly restrict the physical size of each bit on the strip. Accordingly, if the bit size were to markedly decrease from one Cauzin strip to another, a scanner that could read the former strip would not likely be able to read the latter strip. While this limitation is generally of little consequence for paper based strips—inasmuch as the lifetime of these strips is expected to be very short perhaps a few weeks or months such as where a Cauzin strip is printed on a page of a popular monthly or bi-weekly consumer computer magazine, this limitation can not be tolerated with data strips recc Jed on microfilm where the longevity of the media is substantially longer, often measured in decades. Specifically, over the past few years and into the future, the resolution of line scanners; particularly charge coupled device (CCD) scanners, has an will continue to significantly increase as the size of each CCD cell used in a line scanner continues to shrink. Hence, data strips recorded on microfilm at one resolution must be capable of being read by a line scanner operating at a higher resolution. Otherwise, the utility of a microfilmed image would be limited, not by the substantial longevity of the underlying microfilm media itself, but unfortunately by a much shorter time interval required for each successive evolution of line scanners offering an increased resolution to become commercially available in the art. Accordingly, Cauzine strips appear to be highly impractical for use with microfilm images.

Furthermore, horizontal and vertical skew (rotational mis-alignment) can arise in a data strip recorded on microfilm while it is being read by a microfilm line scanner. This skew manifests itself as a rotational misalignment occurring between the orientation of the orthogonal components, e.g. rows and columns, of the data strip itself and the scanning axis of the scanner. If this skew is not taken into account while the strip is being read, then erroneous points on the data strip will be sampled that, depending upon the amount of actual skew that occurs, could produce significant data errors. This skew can arise for a variety of reasons. First, skew can illustratively occur because the axes of the data strip itself were not properly oriented with respect to the axes of the microfilm while the strip was being photographed onto the film—i.e. such that the orthogonal axes of the strip as it appears on the film are not are exactly parallel to corresponding orthogonal axes of the microfilm. Second, slight differential slip that can occur across the width of the film as it moves through a film transport past a read head can introduce skew between the line scanner and a data strip recorded on the film. For whatever reason skew occurs, this skew must be compensated during a read process.

Therefore, a specific need also exists in the art for a technique for use in properly extracting data from a microfilm data strip. This technique should properly extract data from the strip essentially independent of bit size. In addition, this technique, should not require embedding numerous clock bits within the data itself recorded on each row of the strip. Furthermore, this technique should be sufficiently robust to accurately compensate for skew that is likely to occur in reading a microfilmed data strip by a line scanner existing in a microfilm reader. By meeting this specific need, machine readable microfilmed digital data strips can be used along with associated human readable microfilm images co-existing therewith on common microfilm media in order to provide an inexpensive combined microfilm data and image storage system.

DISCLOSURE OF THE INVENTION

Accordingly, it is an object of the present invention to provide apparatus and accompanying methods for use in properly extracting data from a microfilmed data strip.

Another object is to provide such apparatus and methods that properly extract such data from a microfilm data strip essentially independent of the size of the bits that form the data strip.

Another object is to provide such apparatus and methods that do not require that numerous clock bits, if any, be embedded into the data that forms each row in the microfilmed data strip.

A further object is to provide such apparatus and methods that can compensate for skew that is expected to occur between a microfilmed data strip and a line scanner in a microfilm reader while that strip is being read by the scanner.

These and other objects are accomplished in accordance with the teachings of my inventive technique. Through my technique, a scanned bit-mapped data strip is first parsed into successive vertical strips that each has successive rows of pixels. Thereafter, inter-row and inter-pixel differential intensity values are determined for each vertical strip. Vertical line addresses and horizontal pixel addresses in each of the strips are then determined as a function of the pixel positions of the inter-row and inter-pixel differential intensity values associated with that strip. The individual pixels in each vertical strip, which are situated at the horizontal pixel addresses and which lie on those rows in that vertical strip specified by the vertical line addresses, are sampled in order to yield sampled pixel data. All the sampled pixel data collectively represents the values of the data bits stored in the data strip.

Advantageously, with my technique, the line and pixel addresses will appropriately change in response to skew that occurs between the data strip and a microfilm line scanner as the data strip is being scanned and/or to changes in data bit size that occurs from one data strip to the next or even from one data row to the next in a common data strip.

Specifically, my inventive technique determines the location of each data row in the bit-mapped data strip. This is accomplished by parsing the entire data strip into vertical strips of a pre-defined width, illustratively fifty pixels wide. Thereafter, the sum of the pixel values in each pixel row within the vertical strip is determined to yield a series of pixel value sums for that strip. Thereafter, the derivative (differences) between these sums with respect to vertical position is then calculated. A vertical sampling location which cuts across the approximate mid-point of each bit in every data row in the strip is then located as being the position of the mid-point that lies between each pair of successive positive and negative peaks in the derivative. All the vertical sampling locations define the vertical locations (vertical line addresses) of sampling lines, i.e. "horizontal sampling lines", that horizontally run across the data rows in the vertical strip. A similar procedure is performed to locate all the horizontal sampling locations in that vertical strip. These horizontal sampling locations can be determined prior or subsequent to determining the vertical sampling locations in the vertical strip. In either case, all the horizontal sampling locations define horizontal locations (horizontal pixel addresses) for sampling lines, i.e. "vertical sampling lines", that run through vertically aligned columns in the data rows within the vertical strip. In determining the horizontal sampling locations, the inter-pixel derivatives (differences), with respect to position, are determined for each pixel row in a block of pixel rows in the vertical strip to yield a vector of differences for each such row in the block. The block is sized to contain a sufficient number, "t", of pixel rows such that, over the entire block, a transition from white to black or vice versa is likely to occur in each pixel position in at least one pixel row in that block. The absolute values of these ifferences are then combined in vector (columnar) fashion over all the pixel rows that form the block to yield a single vector. The positional mid-points between the positive peaks in all the successive pairs of peaks in the vector locate the horizontal sampling locations (i.e. the horizontal offset of each vertical sampling line) for all the pixel rows contained within that block. The bit-mapped pixel data for this block is then sampled at the positions specified by the intersections of the horizontal and vertical sampling lines in order to yield corresponding sampled pixel values for the data bits residing therein. This procedure is then repeated for each remaining block in the vertical strip with the entire procedure being repeated for each remaining strip in the entire data strip itself. To speed execution, inter-pixel differences only need to be computed for those pixel values that lie on each horizontal sampling line, and sampling only needs to occur at those pixels that are situated at the horizontal pixel addresses and only on those rows specified by the vertical line addresses.

In accordance with a feature of the invention, interrow differential intensity values can be determined through either one of two different approaches. First, the pixel intensity values occurring across each row of pixel values in a strip can be summed and a single derivative value for the current row can be determined as the difference between the sum for a current row and that for an adjacent row. Alternatively, intensity value differences for each pixel in a current row can be calculated as the intensity difference between a current pixel in the current row and a pixel situated immediately therebelow. These differences can then be summed across the current row in order to yield a single inter-row differential intensity value therefor.

BRIEF DESCRIPTION OF THE DRAWINGS

The teachings of the present invention may be readily understood by considering the following detailed description in conjunction with the accompanying drawings, in which:

FIG. 1 depicts a block diagram of an embodiment of microfilm scanning system 100 which is constructed in accordance with the teachings of the present invention;

FIG. 2 depicts an illustrative portion of microfilm 30 shown in FIG. 1;

FIGS. 6A–6D collectively depict a flowchart of Sampling Points Determination and Data Sampling Routine 600 which is implemented within circuit 60 shown in FIG. 1 and which embodies my inventive technique;

To facilitate understanding, identical reference numerals have been used, where possible, to denote identical elements that are common to various figures.

MODES OF CARRYING OUT THE INVENTION

Figure 3:
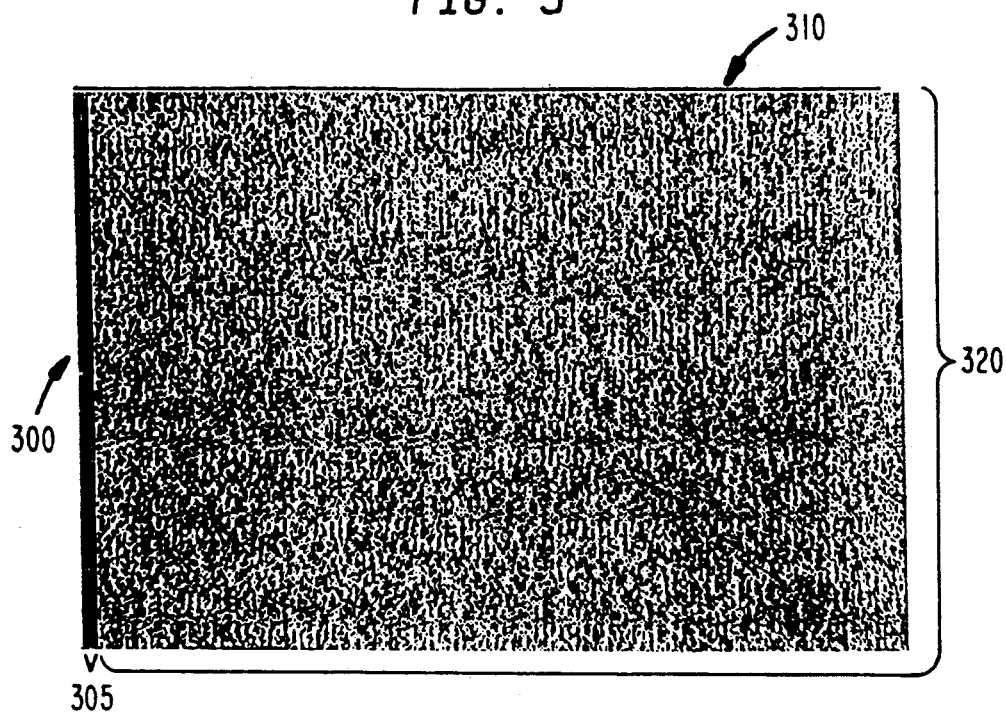
FIG. 3 depicts illustrative data strip 300 which forms part of microfilm 30 shown in FIG. 1.

After reading the following detailed description, those skilled in the art will readily recognize that the teachings of my invention can be easily incorporated into any system which scans an array of bit-mapped data. In this regard, use of my invention would readily permit that system to properly locate appropriate sampling points throughout a bit-mapped input array particularly where the array is subject, during its scanning, to vertical and/or horizontal skew occurring with respect to the axes of a lineal data scanner. The bit-mapped data can be any type of data that is capable of being arranged along two orthogonal axes. Since my system is particularly well suited for use in conjunction with scanning a so-called bit-mapped "data strip" associated with and located on microfilm in the vicinity of a stored visual microfilmed image frame situated thereon, where both the "data strip" and the visual frame are to be scanned by a common line scanner, then to simplify the following discussion, my invention will now be illustratively discussed in that context.

A block diagram of one embodiment of a microfilm scanning system, which is constructed in accordance with the teachings of the present invention is depicted in FIG. 1. As shown, system 100 is formed of optics 40, charge coupled device (CCD) line scanner 50, sampling point determination and data sampling circuit 60 and projection lamp 20.

As shown, microfilm 30 (only a portion of which is specifically shown) generally contains two adjacent stored microfilmed images, such as illustratively images 210 and 240, positioned across its width, with successive images (see FIG. 2) positioned along its length. Each image is typically a microfilmed page of a document and is typically 1/40th of the size of that page. A data strip, of which only strips 220 and 250 are shown in FIG. 1, is associated with each microfilmed image, i.e. images 210 and 240, and is located directly below and in the vicinity of that image. Each strip contains encoded digitized information, such as illustratively pre-defined image identifying criteria, for its corresponding microfilm image.

To read microfilm 30, projection lamp 20, driven by an appropriate control circuit (well known and not shown), back illuminates a strip of microfilm 30 which is drawn by a well-known microfilm transport mechanism typically in the direction shown by arrow 28 through a microfilm reader. Inasmuch as the microfilm transport mechanism is well known and does not form any part of the present invention, it has been completely omitted from the drawings. Moreover, inasmuch as the reader is also well known, then to simpl..y the drawing while still enhancing the reader's understanding of the invention, only those components of the reader, specifically optics 40 and scanner 50, that are needed to understand the invention are specifically shown in the drawings.

Scanner 50 is positioned in front of the microfilm 30 and is perpendicularly oriented to direction through which the microfilm moves during reading. Projection lamp 20, situated behind microfilm 30, projects light through the film which, in turn, enters optical system 40 which is located between film 30 and scanner 50. The optical system ensures that light for only one horizontal scanning line, typically that lying between rays 22 and 24 inclusive, reaches CCD scanner 50 and is focused, as light rays lying between rays 42 and 44 inclusive, onto corresponding cells of scanner 50. Optical system 40 can be suitably adjusted such that scanner 50 can scan microfilm images and data strips that appear on either side of the microfilm, e.g. image 210 and data strip 220 that appear on the left side of film 30 or image 240 and corresponding data strip 250 that appears on the right side of film 30.

During reading, both a microfilm image, such as image 210, and its associated data strip, e,g, strip 220, are successively scanned one horizontal line at a time by CCD line scanner 50. After each line is scanned, scanner 50 moves downward by a pre-defined increment and by a well known scanner transport assembly (also well known and not shown) to scan the next line. This continues until both the entire image and its associated data strip (here collectively forming a complete microfilm frame) have been completely scanned. Once scanning is concluded, the microfilm transport mechanism advances the film to the next frame to be scanned, and so on. For each pixel in a scanned line, a corresponding cell of CCD scanner 50 provides an analog data output which is proportional to the intensity of the light that passes through a portion of scanned image area 210 and which is focused onto that cell. This data, for all such cells, appears in serial clocked form on lead 52. The analog data produced by scanner 50 is routed, via lead 52, to an input of sampling point determination and data sampling circuit 60. Through use of my inventive technique, which will be fully described in detail below, circuit 60 determines which of those pixels, that have been produced by CCD scanner 50 and collectively form a data strip, should be sampled in order to properly extract data from the-strip, particularly in the presence of skew. Circuit 60 provides the appropriately sampled pixel data, in digital form, on output leads 65 which routes this data to downstream digital processing equipment. This equipment interprets and processes the sampled data in a well known fashion. This processing may illustratively include local display of identifying ASCII information contained in the data strip for use by an operator stationed at the microfilm reader. In any event, since this processing equipment also does not form any part of the present invention, it will not be discussed any further. Circuit 60 also provides appropriate well known pixel data clock signals over lead 54 to drive CCD scanner 50. Inasmuch as this signal as well as other clock signals used on scanning system 100 are all readily apparent to those skilled in the art, then, for purposes of simplification, all such signals have generally been omitted from the drawings and the following discussion.

FIG. 2 depicts an illustrative portion of microfilm 30 shown in FIG. 1. As shown, this portion contains microfilmed images 210 and 212 and partial microfilmed image 214, and images 240 and 242 and partial microfilmed image 244 situated on respectively the left and right sides of microfilm 30. Each such image, such as illustratively image 210, contains an image of a documentary page, such as page 201. An appropriate rectangular data strip is situated in the vicinity of and directly beneath its corresponding microfilmed image. As shown, data strips 220, 222, 250 and 252 are located respectively below corresponding images 210, 212, 240 and 242. Microfilm 30 also contains well-known film blips for demarcating the beginning and end locations of corresponding microfilmed frames. Film blips 230 and 235 define scanning areas for a frame containing image 210 and data strip 220, and another such frame containing image 240 and data strip 250, respectively. These blips are counted by microfilm film transport electronics (not shown) during film advance in order to generate an appropriate index of current film position. As is clearly evident, microfilm 30 contains horizontal pairs of microfilmed images and accompanying data strips, with successive images and data strips running vertically along the length of microfilm 30.

FIG. 3 depicts illustrative data strip 300 which forms part of microfilm 30 shown in FIG. 1. This strip is typically approximately 0.24 inches (6 mm) wide by approximately 0.078 inches (2 mm) high. This strip is formed a vertical series of rows of bit-mapped data patterns (hereinafter referred to as "data rows") that fills two-dimensional rectangular area 320 that extends from the top of the strip to its bottom. Each data row contains a ordered co-lineal arrangement of relatively small essentially square white and black bits that extends across the length of that row. The ordering of the data bits in each data row determines the digital data stored therein. A white bit is associated with one binary state; a black bit is associated with the other binary state. The data collectively stored within area 320 defines the data contained within the entire strip. As is clearly evident in FIG. 4, each data row itself is formed of several successive rows of pixels (hereinafter referred to as "pixel rows") with each data bit occupying several vertically and horizontally aligned pixels. The uppermost row in a data strip, i.e. row 310 shown in FIG. 3, contains a row of solid black pixels and is used to provide synchronization during scanning. The first eight leftmost columns of bits, i.e. columns 305, each contains white or black data bits (clock bits), and are used for establishing a read clock for use in reading the data bits contained in each row. In addition, the size of each data bit in each of these columns rows defines the size of the remaining bits in a data row that intersects that column. Other than the bits in row 310 and columns 305, no data clock bits are embedded within the data contained in area 320. Inasmuch as row 310 and columns 305 occupy a very small portion of the total area of strip 300, these bits have little affect on the overall data capacity of the strip.

During reading, scanner 50, as shown in FIG. 1, vertically moves down through strip 300 in order to successively scan each pixel row therein. Inasmuch as each bit occupies several contiguous pixels and due to skew, as discussed below, that may arise between the strip and scanner, the output pixels produced by the scanner must be sampled at proper locations in order to properly extract the data contained in the data strip.

Figure 9:
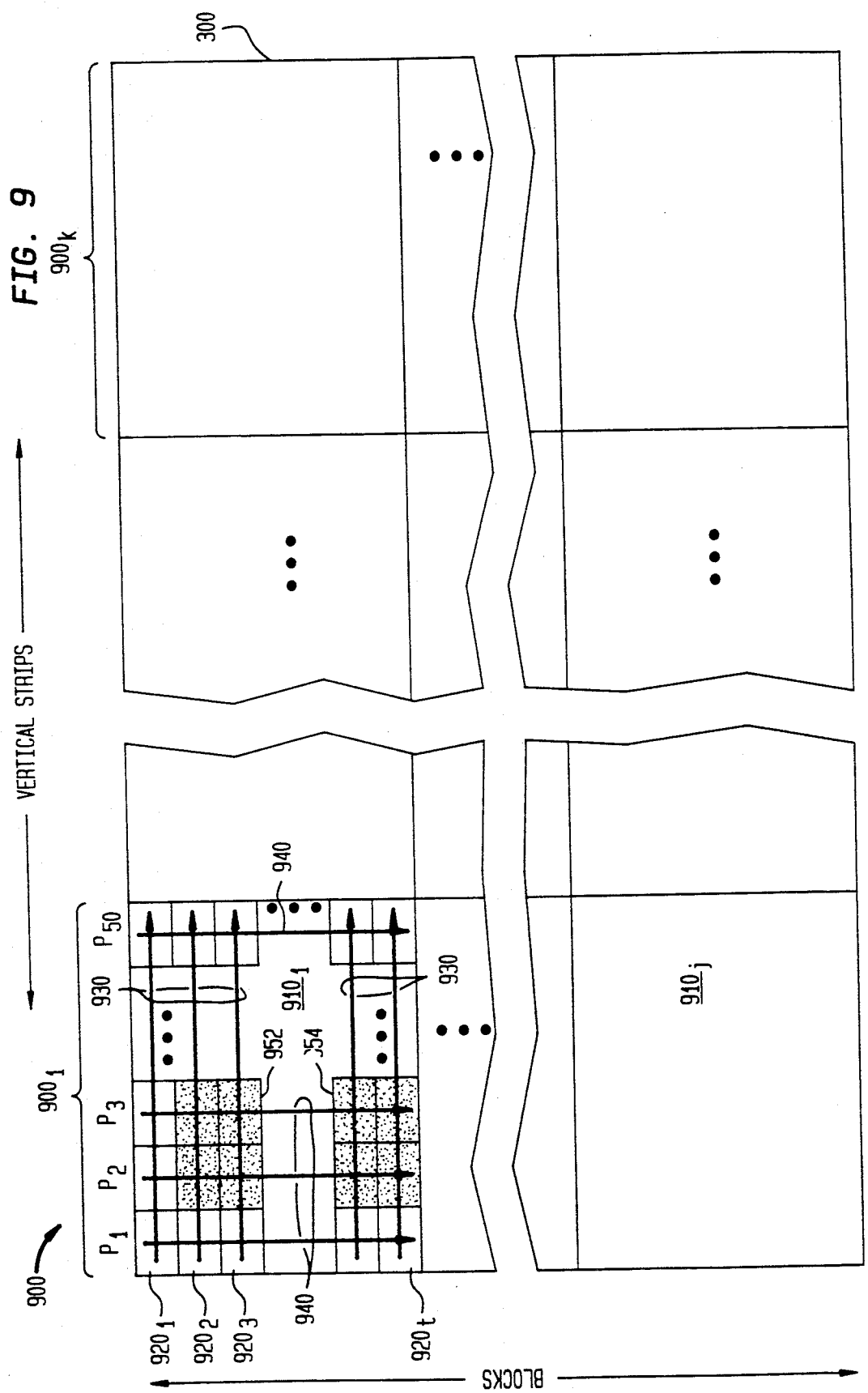
FIG. 9 depicts illustrative data strip 300 shown in FIG. 3 which has been effectively divided into vertical strips and blocks as occurs during use of my inventive technique.

My inventive technique, through use of differential pixel values, i.e. differences between horizontally and vertically successive pixel values, identifies which pixels should be sampled to yield the proper values of the data bits in the strip. To appreciate my inventive technique, reference should now be made to FIG. 9 which depicts illustrative data strip 300 shown in FIG. 3 effectively divided into vertical strips and blocks as occurs during use of my inventive technique.

To determine the appropriate sampling locations, my inventive technique first determines the location of each data row. This is accomplished, as explained in much greater detail below, by first separating the entire data strip, e.g. data strip 300, into vertical strips, specifically strips 900 formed of $900_1$, ..., $900_k$ shown in FIG. 9, of a pre-defined width, illustratively fifty pixels wide. In this regard, strip $900_1$ contains fifty separate columns $P_1$, $P_2$, ..., $P_{50}$ of pixels. Thereafter, the sum of the pixel values in each pixel row, e.g. rows $920_1$, $920_2$, $920_3$, ..., $920_t$, within the vertical strip, e.g. strip $900_1$, is determined, as symbolized by lines 930, to yield a series of pixel value sums for that strip. Thereafter, the derivative (differences) between these sums with respect to vertical position is then calculated. A vertical sampling location which cuts across the approximate mid-point of each bit in every data row in the strip is then located as being the position of the mid-point that lies between each pair of successive positive and negative peaks in the derivative. All the vertical sampling locations (vertical line addresses) define the vertical locations of sampling lines that horizontally run across the data rows in the vertical strip; these lines hereinafter being referred to "horizontal sampling lines". A white inter-data row buffer region that occurs after each successive data row guarantees that sufficiently sharp peaks will occur in the derivative. A similar procedure, as described in detail below, is then performed to determine all the horizontal sampling locations in that vertical strip. These horizontal sampling locations can be determined prior or subsequent to determining the vertical sampling locations in the vertical strip. In either case, all the horizontal sampling locations define horizontal locations (horizontal pixel addresses) for sampling lines that run through vertically aligned columns in the data rows within the vertical strip; these lines hereinafter being referred to as "vertical sampling lines". In determining the horizontal sampling locations, the inter-pixel derivatives (differences), with respect to position, are determined for each pixel row in a block of pixel rows, e.g. block $910_1$, in the vertical strip to yield a vector of differences for each such row in the block. The block is sized to contain a sufficient number, "t", of pixel rows such that, over the entire block, a transition from white to black or vice versa is likely to occur in each pixel position in at least one pixel row in that block. The absolute values of these differences are then combined in vector (columnar) fashion, as symbolized by lines 940, over all the pixel rows that form the block to yield a single vector. The positional mid-points between the positive peaks in all the successive pairs of peaks in the vector locate the horizontal sampling locations (i.e. the horizontal offset of each vertical sampling line) for all the pixel rows contained within that block. The bit-mapped pixel data for this block is then sampled at the positions specified by the intersections of the horizontal and vertical sampling lines in order to yield corresponding sampled pixel values for the data bits residing therein, e.g. illustrative black data bits 952 and 954 lying within block $910_1$. This procedure is then repeated for each remaining block, e.g. block $910_j$, in the vertical strip, e.g. strip $900_1$, with the entire procedure being repeated for each remaining strip, e.g. strip $900_k$, in the entire data strip itself. To speed execution, inter-pixel differences only need to be computed for those pixel values that lie on each horizontal sampling line, and sampling only needs to occur at those pixels that are situated at the horizontal pixel addresses and only on those rows specified by the vertical line addresses. For purposes of illustration, the size of the individual pixels shown in FIG. 9, and specifically within block $900_1$, has been greatly exaggerated.

Figure 4:
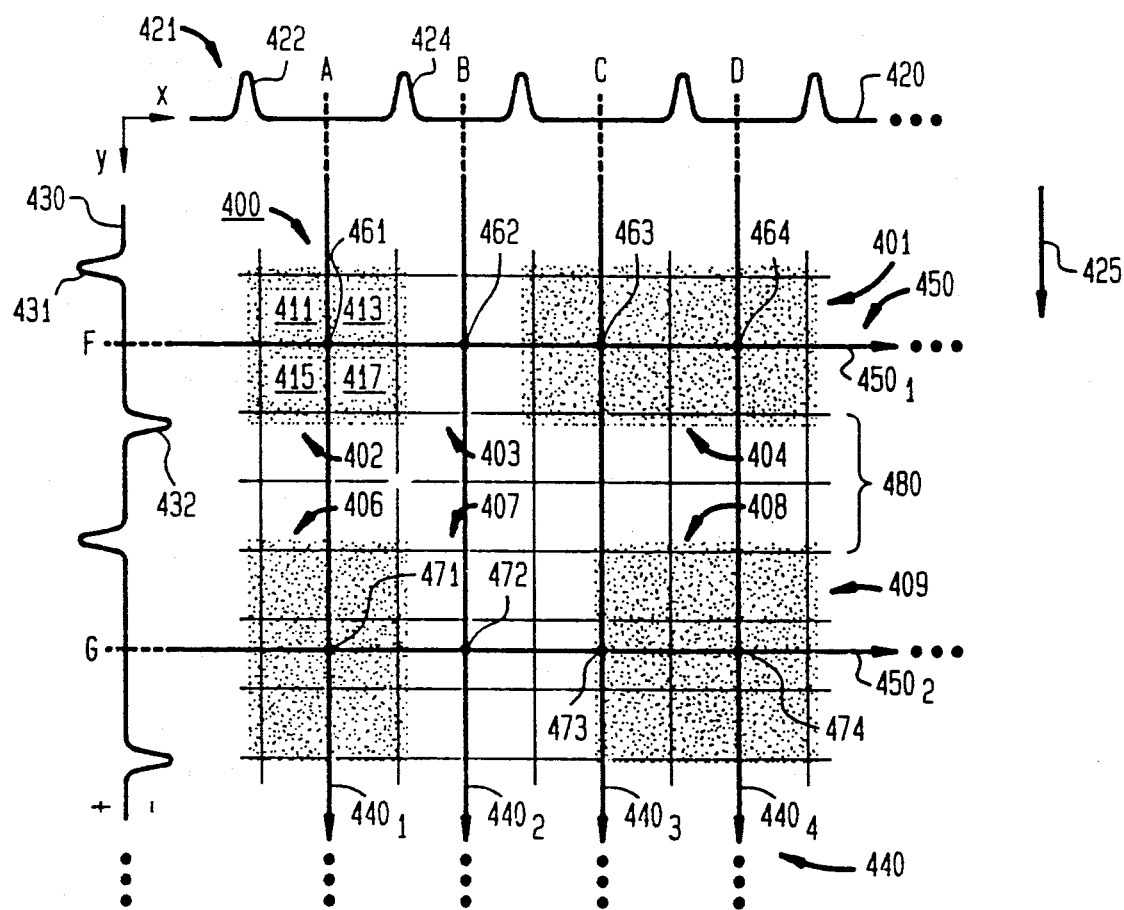
FIG. 4 depicts a small illustrative portion 400 of data strip 300 shown in FIG. 3 but without any skew occurring between this portion of the data strip and a CCD line scanner, illustratively scanner 50 shown in FIG. 1, as it scans this portion.
Figure 5:
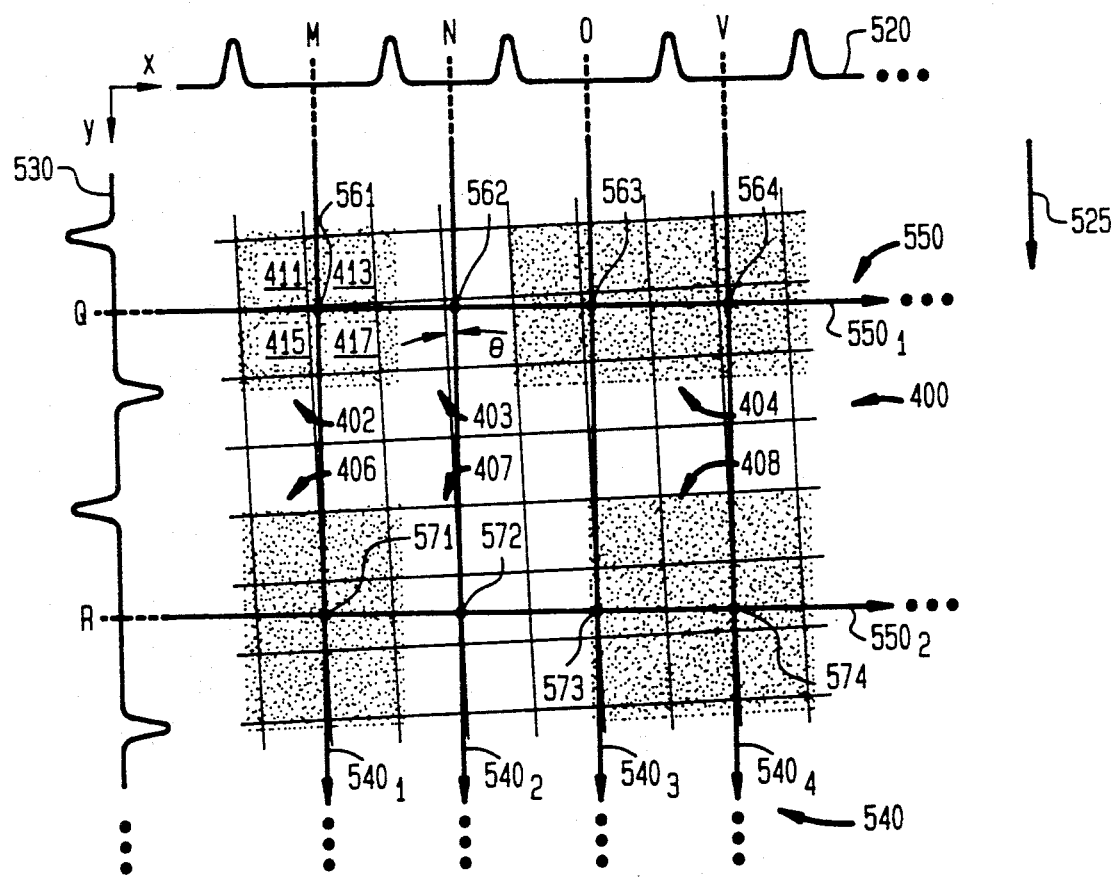
FIG. 5 depicts the same data strip portion shown in FIG. 4 but with a given amount of skew occurring between this portion of the data strip and the CCD line scanner.

The organization of data bits and the manner in which the individual scanned pixels in the data strip are sampled, in accordance with the teachings of my invention, to yield the correct data are shown in FIGS. 4 and 5.

To specifically illustrate my inventive technique, FIG. 4 depicts a small illustrative portion 400 of data strip 300 shown in FIG. 3 but without any skew occurring between this portion of the data strip and CCD line scanner 50, as it scans this portion. As shown here, portion 400 contains typical data rows 401 and 409 that contain black data bits 402 and 404 separated by white data bit 403, and black data bits 406 and 408 separated by white data bit 407, respectively. Data bits are recorded on the strip such that horizontal bits are contiguous; while adjacent data rows are separated by multipixel inter-data row buffer region 480, typically shown as occupying two pixels in height. As such, successive data bits of the same color, e.g. black or white, can directly follow each other on a data row. In order to prevent long data runs of the same color, for purposes of simplifying data extraction, the data stored in the strip is encoded in any one of several well known fashions, such as using bit stuffing, to assure that no more than illustratively three bits of the same color will occur in any one horizontal data run. However, due to the inter-data row buffer region, successive data rows do not touch. Through use of appropriate data encoding, such as for example vertical bit stuffing, the inter-data row buffer region could be eliminated, if desired to appropriately increase the data capacity of the data strip.

The CCD scanner will vertically scan through data strip portion 400, in the direction indicated by arrow 425 to yield a full row of pixel values at a time. Since each bit occupies several pixels, the data produced by the CCD scanner is then sampled to yield only those values which are needed to provide signals indicative of the values of the bits contained in the strip.

Waveforms 420 and 430 shown in FIG. 4 depict the application of my inventive technique to the sampling of data strip portion 400 where no skew occurs between the CCD scanner and the data strip. Lines 450, which comprise lines $450_1$ and $450_2$, form the horizontal sampling lines for portion 400. Lines 440, which comprise lines $440_1$, $440_2$, $440_3$ and $440_4$, form the vertical sampling lines for data strip portion 400.

Specifically, to determine the vertical position of each one of horizontal sampling lines 450, the pixel values in each pixel row across portion 400 are summed with the derivatives then being computed of the summed values with respect to vertical position. This results in curve 430 which contains positive and negative peaks, each peak defining an edge between a one data row and either a following or preceding inter-data row buffer region. The distance, in pixel positions, between each successive positive peak and its following negative peak defines the width of a corresponding data row. Half this distance, i.e. the mid-point between these peaks, defines a vertical position of a center line running across the data row. Here, the distance between positive peak 431 and negative peak 432 on curve 430 defines the height of data row 401 with the location of mid-point F on curve 430 defining the vertical position of horizontal sampling line $450_1$. In a similar fashion, the location of mid-point G on curve 430 is determined to specify the vertical location of horizontal sampling line $450_2$. For negative logic data bits values (where one is represented by a group of contiguous white pixels and a zero is represented by a group of contiguous black pixels), each vertical position would be chosen as a corresponding mid-point situated between a local negative peak and its immediately following local positive peak instead of the opposite condition stated above.

Now, to determine the horizontal positions of each one of vertical sampling lines 440, the derivatives in pixel intensity values (inter-pixel differences), as a function of position, that occur across each pixel row extending through portion 400 are calculated. The absolute values of these derivatives for a block of pixel rows within the vertical strip containing portion 400 are then determined and added vectorially to yield a vector of absolute derivative values. Assume, for purposes of simplifying the discussion, that portion 400 lies completely within a single block of pixel rows. The resulting vector, plotted as a function of position, is shown as curve 420. Each horizontal sampling position in the block is then calculated as the position of the mid-point that occurs between the peaks in each successive pair of peaks. For example, the distance, measured in pixel positions, between peaks 422 and 424 in peaks 421 defines the expected width of the first data bit in rows 401 and 409. Owing to the vectorial sum of the absolute derivative values, this width is an average width. As noted above, such an average sum is calculated, rather than relying on the inter-pixel differences alone, because contiguous bits of the same color can occur along a common data row. Such an average assures, to the extent reasonably possible, that intensity value transition(s) will occur within the average. The positions of illustrative mid-points A, B, C and D in curve 420 define the horizontal locations of corresponding vertical sampling lines $440_1$, $440_2$, $440_3$ and $440_4$. The pixel positions of the points of intersection of vertical and horizontal sampling lines 440 and 450, i.e. points 461, 462, 463 and 464 on line $450_1$ and points 471, 472, 473 and 474 on line $450_2$, collectively define the sampling locations of the bit-mapped pixel data that forms data strip portion 400.

Inasmuch as the distances between successive peaks on the derivative curves, e.g. curves 420 and 430, will merely increase or decrease as the bit size increases or decreases, the position of the mid-points determined by these curves, and hence the sampling points, will accurately adjust to changes in bit size. As such, my inventive technique functions independently of bit size to locate the proper pixel sampling locations.

FIG. 5 depicts data strip portion 400 shown in FIG. 4 but with a given amount of skew, $\theta°$ (generally 5 degrees or less), occurring between this portion and the CCD line scanner. This data strip portion is scanned in the direction given by arrow 525. The same procedure, as described above, for locating the vertical and horizontal sampling lines, is used here in the presence of skew. The vertical and horizontal sampling lines are shown as lines 540 and 550 containing respectively vertical sampling lines $540_1$, $540_2$, $540_3$ and $540_4$ and horizontal sampling lines $550_1$ and $550_2$. Determination of the vertical inter-pixel row derivatives, as described above, results in illustrative curve 530 of successive positive and negative peaks for skewed data strip portion 400 shown in FIG. 5. Mid-points Q and R on curve 530 define the vertical locations of horizontal sampling lines $550_1$ and $550_2$, respectively. Similarly, the determination of the summed absolute values of the inter-pixel derivatives in a block of successive pixel rows that contains skewed portion 400 results in curve 520. Mid-points M, N, 0 and V on curve 520 define the horizontal locations of vertical sampling lines $540_1$, $540_2$, $540_3$ and 540₄, respectively. The location of the points of intersections of the vertical and horizontal sampling lines, specifically points 561, 562, 563 and 564 on line 550₁ and points 571, 572, 573 and 574 on line 550₂, collectively defines the sampling locations for the bit-mapped pixel data that forms skewed data strip portion 400 shown in FIG. 5. As can be seen by comparing the sampling locations shown in FIG. 4 and FIG. 5, the locations at which the pixels are sampled to yield corresponding data bit values have shifted due to skew. As noted above, the block size needs to be made sufficiently large to assure that a pixel value transition occurs in each horizontal location in the block. However, since the skew that occurs within a single data strip, such as strip 300 shown in FIG. 3 can vary due to, inter alia, film weave, the block size must remain sufficiently small such that the skew that occurs within any block will be essentially constant throughout that block.

Not only will the pixel positions between the midpoints on curves 520 and 530 shift depending upon the size of the data bits from one data strip to the next, or even from one data row to the next within the same strip, but also these positions will shift appropriately based upon the amount of skew that exists between the image portion and the CCD scanner, thereby advantageously selecting the appropriate pixel sampling locations under either or both of these conditions. The summation processes used in locating the horizontal and vertical sampling lines within a block will vary in response to the statistical average value of the skew that occurs throughout that block. As such, on the average, the sampling points selected within a block will compensate for the average skew occurring therein. If the block size is sufficiently small such that the skew occurring within a block is essentially constant throughout, then my technique is likely to accurately select locations for the sampling points that are properly compensated for the skew occurring within each block.

Figure 6:
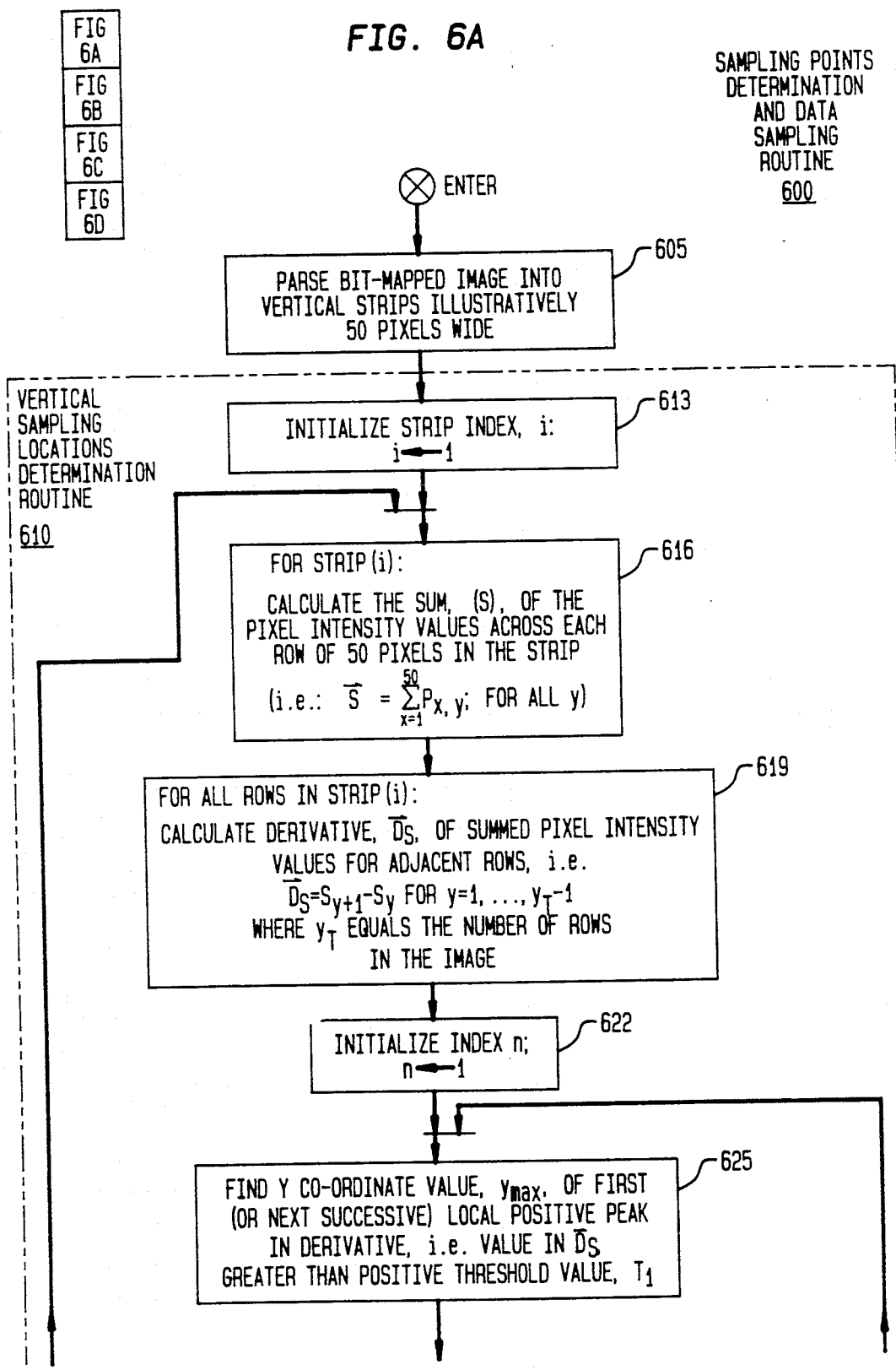
FIG. 6 depicts the correct alignment of the drawing sheets for FIGS. 6A–6D.

FIGS. 6A-6D collectively depict a flowchart of Sampling Points Determination and Data Sampling Routine 600 which is implemented within circuit 60 shown in FIG. 1 and which embodies my inventive technique; the correct alignment of the drawing sheets for these figures is shown in FIG. 6. This routine would be executed within circuitry 60 in the event this circuitry were to be implemented using a well known micro-computer.

Upon entry into routine 600, execution first proceeds to block 605 which parses the incoming bit-mapped image into vertical strips that are illustratively fifty pixel wide. The width of fifty pixels is not critical; however, this value, which is empirically determined, should remain sufficiently small. This restriction exists because, as the length of each pixel row within a vertical strip increases, the amount of skew that can be accurately compensated on an end-to-end basis across each pixel row within the strip decreases. This occurs inasmuch as the angular value of the skew equals the arctangent of the reciprocal of the length of a pixel row measured in pixel positions. Hence, in practice, for pixel rows having 50 pixels, the skew should remain less than a limit of approximately five degrees to assure that accurate skew compensation results. During scanning of microfilmed data strips, this limit is not likely to pose any problems inasmuch as the actual skew that will occur in any one instance will likely remain well within this limit. However, the length of each pixel row within a strip should not be made too small inasmuch as fewer pixels will be horizontally summed thereby resulting in an increased sensitivity to noise, errors, image artifacts and the like.

Thereafter, execution proceeds to vertical sampling locations determination routine 610, formed of blocks 613-644, to locate all the vertical sampling points within the entire data strip. Next, horizontal sampling locations determination routine 650, formed of blocks 652-691, is executed to locate all the horizontal sampling points within the entire data strip and for appropriately sampling the bit-mapped data strip to yield the sampled pixel data.

In particular, upon entry into vertical sampling locations determination routine 610, execution first proceeds to block 613 to initialize the value of strip index, i, to one. Execution then proceeds to block 616 which, when executed, calculates the sum, S, of the pixel intensity values across each row of fifty pixels in strip i. Once these sums are computed, a vector S results with as many components as there are rows in the strip. Thereafter, block 619 is executed. This block calculates the derivative (difference) of the summed pixel intensity values, i.e. $S_{y+1} - S_y$, as a function of the vertical pixel row position. Once these derivatives are computed for all the sums thereby resulting in a vector $D_s$ of successive derivative values, execution proceeds to block 622 to initialize the value of an index, n, to one. Thereafter, execution proceeds to block 625. This block, when executed, finds the vertical (y) co-ordinate value, $y_{max}$, of the first (or for each successive iteration through this block -- the next successive) local positive peak in the vector of derivative values that exceeds a pre-defined positive threshold value, $T_1$. Once such a local positive peak has been identified by block 625, execution proceeds to block 628. This block, when executed, finds the vertical (y) co-ordinate value, $y_{min}$, of the first (or for each successive iteration through this block—the next successive) local negative peak in the same vector of derivative values that is less than a pre-defined negative threshold value, $T_2$. Threshold values $T_1$ and $T_2$ are not critical and are empirically set to corresponding values that are sufficiently high or low to prevent noise from generating false local positive or negative peaks. After block 628 has executed to identify a negative peak, execution proceeds to block 632 which finds the vertical location, $L_y(n)$, of a horizontal sampling line that runs through a vertical position defined by a mid-point located between the vertical positions of positive and negative peaks, i.e. $L_y(n) = (y_{max} + y_{min})/2$. The position of the mid-point is then stored as a next component in vector $L_y$. Once block 632 has fully executed, execution proceeds to decision block 635. This decision block tests whether the end of the current strip, i.e. vertical strip i, (the end being the bottom of the entire data strip) has been reached. In the event that the end of this strip has not yet been reached, then execution proceeds, via the NO path emanating from decision block 635, to block 638. This latter block, when executed, increments the value of index n by one. Thereafter, execution loops back, via path 640, to execution block 625 to find the next local positive peak in strip i, and so on. Alternatively, if the end of vertical strip i has been reached, then execution is directed, via the YES path emanating from decision block 635, to decision block 644. This latter decision block determines whether the last vertical strip has been processed. In the event that one or more vertical strips remain to be processed, then decision block 644 routes execution, via NO path 648, to block 642. This latter block, when executed, increments the value of strip index i by one to point to the next successive vertical strip. Thereafter, execution loops back, via path 643, to block 616 to process this next vertical strip, and so on. Alternatively, if the last vertical strip has been processed, then all the vertical sampling locations of the horizontal sampling lines have been determined throughout the entire data strip. At this point, execution of vertical sampling locations determination routine 610 is now complete. Accordingly, decision block 644 routes execution, via YES path 646, to horizontal sampling locations determination routine 650.

Upon entry into routine 650, execution proceeds to block 655 which, when executed, initializes the value of the strip index i to one. Thereafter, block 658 is executed to initialize the value of a block index, k, to one. Once this occurs, execution proceeds to block 661. Block 661, when executed, performs several functions. First, for each individual data row identified from vector $L_y$, i.e. row j, in the current block of "t" data rows (where "t" is a constant determined in the manner described above), block 661 calculates the derivative (difference), $D_p(x,j)$, between pixel intensity values, i.e. $(P_{x+1,j} - P_{x,j})$, as a function of the horizontal position (x) in the row. Once such a derivative value is calculated, its absolute value, $uD_p(x,j)u$, is determined and stored within an appropriate location in an array. Thereafter, block 661 computes the vertical sum of each column of absolute derivative values in this array to yield a vector summed absolute derivative values, uDu, for block k. Once this vector is totally computed, execution proceeds from block 661 to block 664 which, when executed, initializes the value of the index n to one. Thereafter, block 667 is then executed. This block finds the horizontal (x) co-ordinate value of each successive component in summed absolute derivative vector, uDu, that exceeds a positive threshold value, $T_3$. Threshold value $T_3$ is also not critical and is empirically set to a value that is sufficient high to prevent noise from generating false local positive peaks. All of these horizontal co-ordinate value are stored to form a vector $X_d$ of these values, with the value of index n being appropriately incremented with each new entry in order to point to a relative address of a successive memory location for this entry. Once this vector has been determined for the current block, execution proceeds from block 667 to block 673. This latter block, when executed, finds the horizontal location, $L_x$, of every sampling point on every data row in the current block, i.e. block k, as the value of the mid-point, i.e. $L_x(n) = (X_d(n) + X_d(n+1))/2$, between the horizontal co-ordinate values stored in each adjacent pair of values in vector $X_d$. Once all the horizontal sampling points have been calculated, then block 675 is executed. This block performs the actual sampling of the pixel data scanned from data strip. This data is sampled, a block at a time, at the horizontal pixel locations $L_x(n)$ at corresponding vertical positions in vector $L_y$ in each data row of block k of current strip i and then provided by block 675 as output sampled pixel data. Once block 675 has fully executed, execution proceeds to decision block 678. This decision block tests whether the last block of t data rows in the current vertical strip has been reached. In the event that the last block has not yet been reached, then execution proceeds, via the NO path emanating from decision block 678, to block 682. This latter block, when executed, increments the value of block index k by one. Thereafter, execution loops back, via path 684, to execution block 661 to process the next block of pixel rows in vertical strip i, and so on. Alternatively, if the last block in the current vertical strip has been reached, then execution is directed, via the YES path emanating from decision block 678, to decision block 686. This latter decision block determines whether the last vertical strip has been processed. In the event that one or more vertical strips remain to be processed, then decision block 686 routes execution, via NO path 689, to block 691. This latter block, when executed, increments the value of strip index i by one to point to the next successive vertical strip. Thereafter, execution loops back, via path 693, to block 658 to process this next vertical strip, and so on. Alternatively, if the last vertical strip has been processed, then all the horizontal sampling locations of the vertical sampling lines have been determined throughout the entire data strip, the entire data strip has been appropriately sampled and the sampled locations have been provided as output sampled pixel data. At this point, execution of horizontal sampling locations determination routine 650 is now complete. Accordingly, execution exits both from this routine and from sampling points determination and data sampling routine 600, via YES path 687, that emanates from decision block 686.

Figure 7:
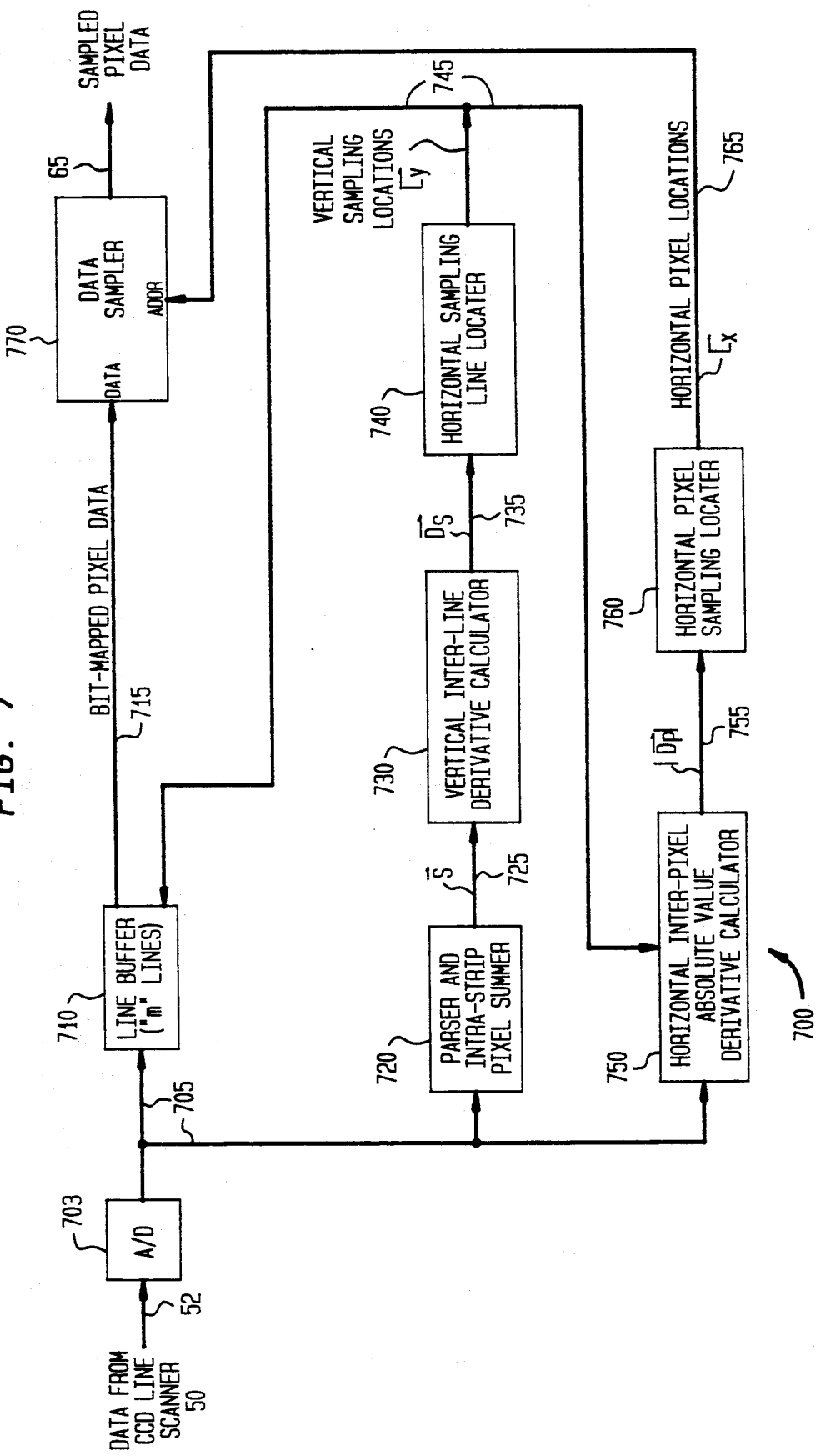
FIG. 7 depicts a high level block diagram of circuitry 700 which is a hardware implementation of circuit 60 shown in FIG. 1 and which embodies my inventive technique.

FIG. 7 depicts a high level block diagram of circuitry 700 which is a hardware implementation of circuit 60 shown in FIG. 1 and which embodies my inventive technique. As shown, this implementation contains analog-to-digital (A/D) converter 703, line buffer 710, parser and intra-strip pixel summer 720, vertical inter-line derivative calculator 730, vertical sampling line locator 740, horizontal inter-pixel absolute value derivative calculator 750, horizontal pixel sampling locator 760 and data sampler 770. The functions provided by each of these components, with the exception of A/D converter 703 and line buffer 710, has been fully described above—though not with reference to these specific components in circuitry 700. Given the functional descriptions provided above, the specific circuitry, preferably dedicated digital hardware, which is used to form each of these components is readily apparent to anyone skilled in the art. The hardware implementation shown in FIG. 7 is one embodiment (as is that shown in FIG. 8 which is discussed below) which is preferred, over a strictly software approach, for use in those high speed image processing applications where data sampling is to occur at or near real-time speed.

Incoming pixel data from CCD line scanner 50 is routed, via lead 52, to an analog input to A/D converter 703. This converter generates on leads 705 an eight-bit digital word (with values varying from "0" to "255") that represents the analog value of each input pixel then appearing on lead 52. This word, is routed, via leads 705, to an input of line buffer 710, parser and intra-strip pixel summer 720 and horizontal inter-pixel absolute value derivative calculator 750. Buffer 710 stores "m" pixel rows (lines) of incoming pixel data. Illustratively, m is set to approximately one hundred rows such that by the time the entire data strip has been scanned most of it will have been processed through circuitry 700.

In response to incoming pixel data for the data strip being scanned, parser and summer 720 parses the scanned data strip into vertical strips. Block 720 also calculates the horizontal sums across each pixel row in each strip. Inasmuch as the data strip is being scanned vertically, all the vertical strips that form the data strip are sequentially processed by circuitry 700 in piecemeal row at a time fashion as each successive pixel row in the data strip is scanned. The output horizontal pixel sums, vector S, for each vertical strip produced by parser and intra-strip pixel summer 720 are applied, via leads 725, as input to vertical inter-line derivative calculator 730. In response to these sums, calculator 730 calculates the derivative (difference) of these summed pixel values with respect to vertical pixel location thereof. The resulting derivative values, vector $D_S$, are applied by calculator 730, via leads 735, to vertical sampling line locator 740. This locator determines, in the manner described above using mid-point computations, the vertical locations, vector $L_y$, of all the horizontal sampling lines in each vertical strip. These locations are routed, via leads 745, to an input of line buffer 710 in order to specify the portions of the pixel rows that are to be supplied therefrom, as pixel rows contained within each vertical strip, over leads 715 as bit-mapped pixel data to a data input of data sampler 770. Simultaneously, the vertical sampling locations are applied, also by leads 745, to a control input of horizontal inter-pixel absolute value derivative calculator 750 in order to specify to calculator 750 which rows of input pixels appearing on leads 705 it is to process for each vertical strip. In this manner, calculator 750 only processes the pixel rows in each vertical strip that contain pixel values that are to be actually sampled, thereby significantly reducing processing time that would otherwise be required if every pixel row were to be processed through calculator 750. For every pixel row that is to be processed, calculator 750 determines the absolute values of the derivative of the pixel intensity values that occur across that row. The resulting absolute derivative values, $uD_pu$, are applied, via leads 755, as input to horizontal pixel sampling locator 760. This locator sums the absolute derivative values over all of the columns that exist in blocks that are horizontally aligned across all the vertical strips in the data strip. Based upon the values of these sums, locator 760 determines, through mid-point computations as described above, the horizontal pixel locations, vector $L_x$, of the sampling points on every horizontal sampling line for each such block. These horizontal locations are then applied, via leads 765, to an address (Addr) input of data sampler 770 in order to identify the specific pixels that are to be sampled from the bit-mapped pixel data then appearing on leads 715. In response to these locations, data sampler 770 samples the pixel data and provides the resulting sampled pixel data values on output leads 65.

Figures 8, 8A:
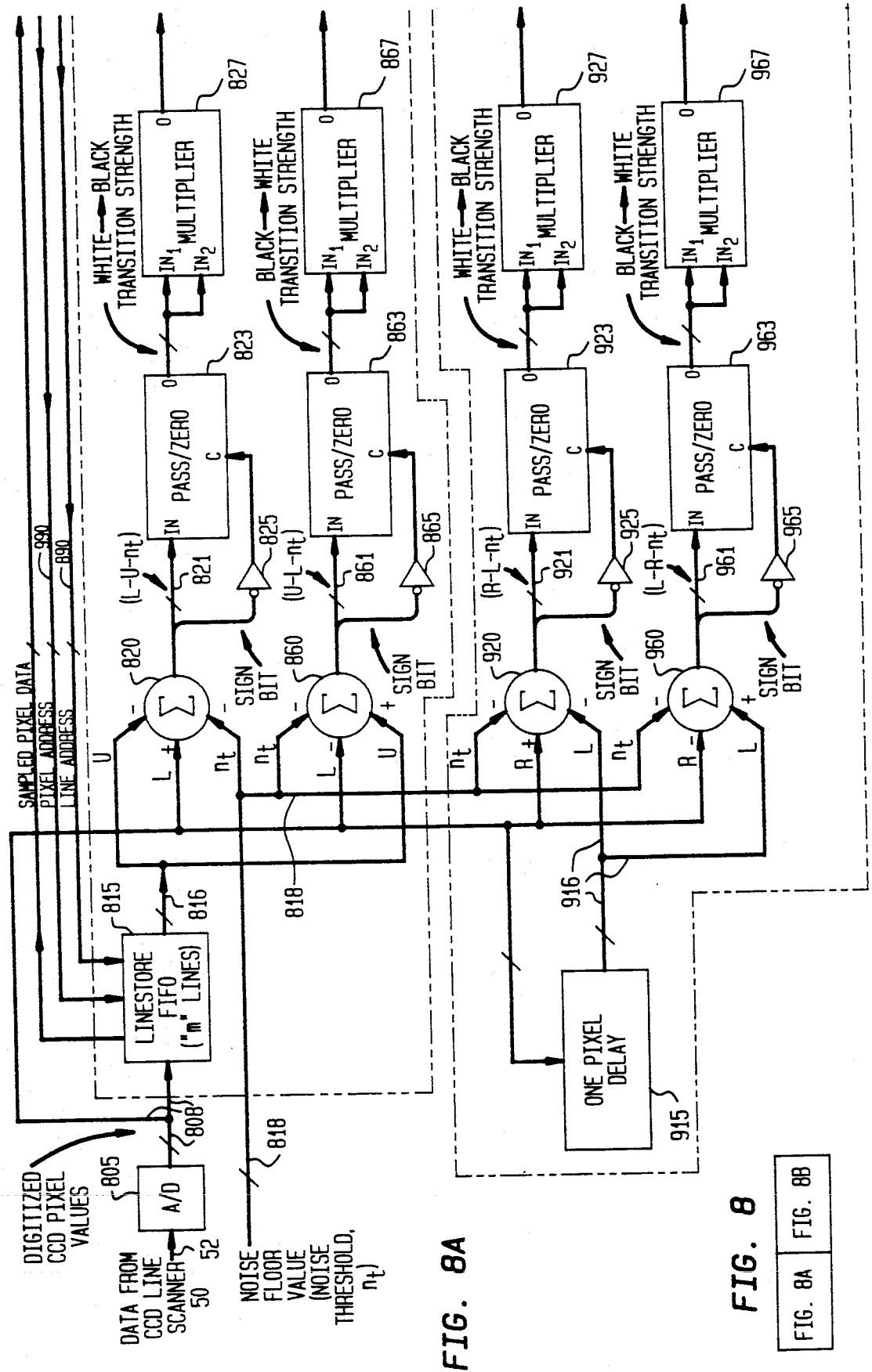
FIG. 8 depicts the correct alignment of the drawing sheets for FIGS. 8A and 8B.
FIGS. 8A and 8B collectively depict a detailed block diagram of circuitry 800 which is a different hardware implementation of circuit 60 shown in FIG. 1 and which embodies a simple variant of my inventive technique.
Figure 8B:
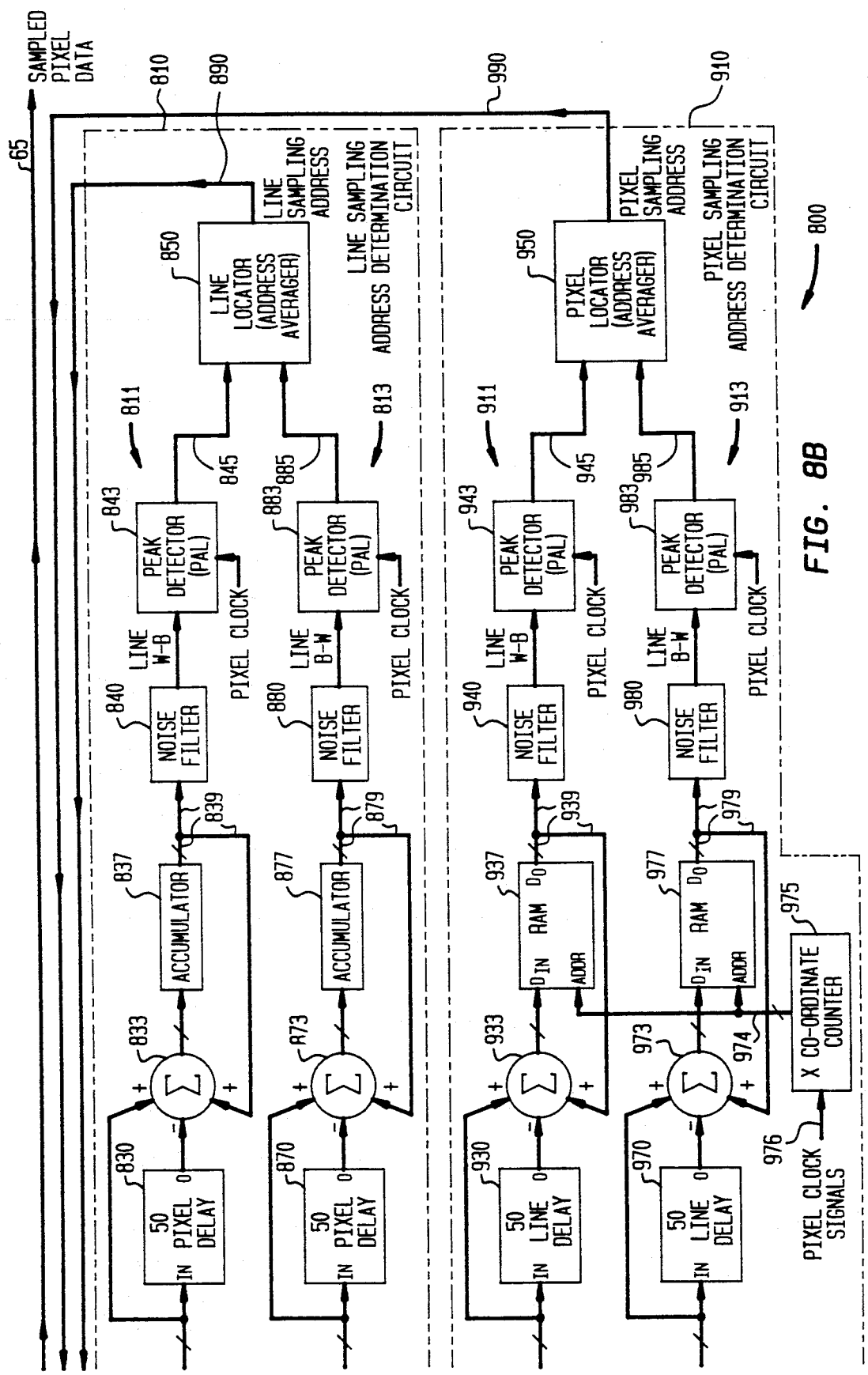

FIGS. 8A and 8B collectively depict a detailed block diagram of circuitry 800 which is a different hardware implementation of circuit 60 shown in FIG. 1 and which embodies a simple variant of my inventive technique. The correct alignment of the drawing sheets for FIGS. 8A and 8B is shown in FIG. 8.

Here, rather than computing horizontal sums and finding the derivative of these sums, circuitry 800 first computes the derivative (differences) between the intensity values of adjacent horizontal and vertical pixels and then appropriately sums these derivatives. Though the order of computation is reversed from that described above, nevertheless, vertical and horizontal inter-pixel differences are still used to locate appropriate sampling points in the bit-map of the scanned data strip.

Circuitry 800 contains A/D converter 805 and line sampling address determination circuit 810 and pixel sampling address determination circuit 910. A/D converter 805 functions identically to A/D converter 703 described above in connection with circuitry 700 shown in FIG. 7. Circuit 810, shown in FIG. 8, determines the specific lines of incoming pixel data that are to be sampled; while circuit 910 determines the addresses of the specific pixels on these lines that are to be sampled.

Within circuit 810, FIFO 815 stores the incoming digitized eight-bit pixel data produced by A/D converter 805. The line and pixel addresses collectively produced by circuits 810 and 910, via leads 890 and 990, are applied to linestore FIFO 815 in order to access appropriate pixels stored therein that are to be read from the FIFO onto output leads 65 as the sampled pixel data. Here, the intersection of the line and pixel addresses define the specific pixels in the bit-map of the data strip that will be sampled.

Both circuits 810 and 910 operate in a highly similar fashion. Each of these circuits first computes appropriate inter-pixel intensity differences, squares these differences, sums the squared differences accordingly, detects peaks in these differences and either locates proper sampling lines or proper sampling points therein through address averaging (mid-point determination). The resulting line and point addresses are collectively applied from both circuits to sample the incoming bit-mapped pixel data through selective memory accessing involving FIFO 815. Given the high degree of similarity between circuits 810 and 910, circuit 810 will be specifically discussed with the differences noted between this circuit and circuit 910.

Circuit 810 determines differences (derivatives) in intensity values between a present pixel (its value referred to within circuit 810 as "U") and the pixel situated immediately therebelow (its value referred to within circuit 810 as "L"). The incoming digitized pixels are applied, via leads 808, to one input of summers 820 and 860. Processing chain 811, consisting of components 820–843, exists to process transitions in the direction of white-to-black of two vertically aligned pixels moving through the image; while an identical processing chain, chain 813, consisting of components 860–883, exists to process transitions the occur in the direction of black-to-white involving the same vertically aligned pixels moving through the image. Given the nearly identical nature of these chains, only chain 811 will be specifically discussed, with the differences noted between these two chains. In addition to storing "m" lines, FIFO 815 also delays each incoming pixel row by one line and provides the delayed pixel row of data on leads 816.

Within chain 811, summer 820 subtracts the intensity values for the upper pixel delayed through FIFO 815 and appearing on leads 816 from the intensity value for the lower pixel appearing on leads 808 and produced by A/D converter 805. In addition, a pre-determined multi-bit digital noise floor value ($n_t$) is applied, via leads 818, as input to summer 820. The noise floor value is subtracted by this summer from the intensity value difference that occurs between these two pixels. In the event that the intensity value difference does not exceed the noise floor then the output of the summer is negative; otherwise this output is positive. The output produced by summer 820 (L-U-$n_t$) is applied via leads 821 to an input of PASS/ZERO circuit 823. This circuit is a simple combinatorial logic circuit. In response to a high level input appearing on its control (C) input, circuit 823 passes the value applied to its input unchanged to its output; otherwise circuit 823, in response to a low level control input, applies the value zero to its output (clamps its output to zero) regardless of the value applied to its input. In chain 811, the value of the sign bit produced by summer 820 is inverted and then buffered by inverter 825 with the result therefrom applied to the control input of PASS/ZERO circuit 823. Consequently, if the intensity difference occurring in the white-to-black direction exceeds the noise floor thereby providing a positive value on leads 821, a positive level is applied to the control input of circuit 823 which causes this circuit to route the positive value therethrough to both inputs of multiplier 827. Inasmuch as both inputs to multiplier 827 receive the same input, this multiplier provides a squaring function. This function, which is not critical, is used to accentuate large inter-pixel intensity differences and can be readily implemented through a look-up table fabricated in read only memory (ROM). The output of multiplier 827 is simultaneously routed to an input of 50-pixel delay 830 and to a positive input of summer 833. The output of delay 830 is routed to a negative input to summer 833. The output of this summer feeds an input of accumulator 837, the output of which is fed back, via leads 839, to a positive input to the same summer. Accordingly, with this configuration, accumulator 837 maintains a running total of vertical inter-pixel differences that occur over a distance of 50 pixels. The output of accumulator 837 is also routed over leads 839 to an input of noise filter 840 which digitally removes noise from the summed output. The filtered sums produced by noise filter 840 for transitions occurring in the white-to-black direction are applied along with a pixel clock to inputs of peak detector 843. This peak detector is typically implemented with a programmable array logic circuit that has been programmed to maintain a count of vertical row positions and to properly sort incoming peaks in the transitions appearing in the filtered sums produced by filter 840. These peaks define the leading edges of data bits situated in successive 50-pixel rows presently being processed across the image. The count that occurs at any such peak provides the vertical pixel address of that peak. As stated, above, chain 813 functions in the same manner as does chain 811 expect that the former chain determines the locations of peaks that occur for transitions in the black-to-white direction for two vertically aligned pixel pairs rather than in the white-to-black direction. As such, the transitions processed by chain 813 define the vertical pixel locations of the trailing edges of data bits situated in successive 50-pixel rows that are presently being processed across the image. In response to the addresses of the peaks produced by peak detectors 843 and 883 and appearing on respective leads 845 and 885, line locator 850 determines the vertical location of the mid-points situated therebetween, through address averaging, and applies the resulting averaged address values on leads 890 as the (vertical) line addresses.

Circuit 910 functions in an essentially identical manner as does circuit 810. As contrasted with circuit 810, circuit 910 determines differences of horizontally adjacent pixels occurring along each pixel row and combines the differences for vertically aligned pixels that occur over a block of 50-pixel rows. A present pixel, here the left pixel, has a value referred to within circuit 910 as "L"; while a value of a pixel situated to the immediate right of the present pixel is referred to within circuit 910 as "R". Instead of delaying incoming pixels by a full line, through e.g. FIFO 815, circuit 910 delays these pixels by one pixel location using one pixel delay 915. Furthermore, in lieu of forming one accumulated result over a 50-pixel distance as occurs in each chain of circuit 810, circuit 910, which determines horizontal sampling locations on a given horizontal sampling line, stores separate accumulated values of horizontal inter-pixel difference values. These values represent summed horizontal inter-pixel differences (column sums) for each vertically aligned column of pixels in 50 rows of 50 pixels each. These sums are stored in read only memories 937 and 977 which contain 50 multi-bit locations. These RAMs are mutually addressed through X coordinate counter 975. By counting pixel clock signals appearing on lead 976, counter 975 maintains a count of the present pixel position in a pixel row presently being processed. The contents of counter 975 are applied over leads 974 to the address inputs of both RAMs. Circuit 910 contains chain 911, formed of components 920–943, for locating horizontal pixel addresses of peaks of leading (in the white-to-black direction) horizontal transitions of data bits in any pixel row and chain 913, formed of components 960–983, for locating horizontal pixel addresses of peaks of trailing (in the black-to-white direction) horizontal transitions of data bits in the same pixel row. These addresses are jointly processed by pixel locator 950, which through address averaging occurring in the same fashion as in line locator 850, determines the horizontal address of each pixel on a pixel row that should be sampled and applies each resulting averaged address value on leads 990 as the pixel address.

By now, those skilled in the art clearly recognize that use of my inventive technique is not limited to use with data strips that merely store identifying information for associated microfilmed images. Rather, this technique can be used in conjunction with any microfilmed data strip regardless of its contents. In this regard, rather than storing identifying data for an image, a data strip could store data for various pre-defined image characteristics of the original image itself or even the original image itself in encoded digital form. In this manner, the data strip, being substantially immune to fading and other artifacts, such as scratches, that many occur in microfilmed images over time, can be read and used, in conjunction with the microfilmed image as it then exists, to compensate, using suitable error correction techniques, for any aging and/or other media-based degradation affects that exist in this image thereby producing a resulting image that duplicates the quality inherent in the original image. As such, even if a microfilmed image ages and deteriorates over time, use of the data recorded in the data strip could be used, in most situations, to re-construct a corresponding image of original quality in spite of any such deterioration of the media.

Furthermore, the human readable microfilmed image can be fully replaced with a microfilmed data strip. Through the use of suitable well known data compression techniques, a single data strip, when appropriately sized to fill an area heretofore available to hold a microfilm image, may be able to store upwards of fifty or more pages of compressed digitally encoded images of documentary pages. Hence, by reducing the number of such frames needed to store separate pages of a document, the information storage capacity of a roll of microfilm can be significantly increased thereby reducing the overall storage costs associated with microfilmed records. Alternatively, these strips may be used to store other types of digital data, apart from just compressed images. In fact, the storage capacities of the resulting microfilm records that merely contain successive data strips may rival that of magnetic media but advantageously provide the longevity associated with microfilm rather than the relatively short lifetime inherent in magnetic media.

Even though I have described my invention in terms of use with a line scanner, my inventive technique can be used, with suitable modifications readily apparent to anyone skilled in the art, in conjunction with a wide variety of different scanners including array scanners. All these scanners are characterized as being those which are capable of providing corresponding individual signals for successive vertically and horizontally aligned pixels in the image. Use of any such scanner readily permits inter-pixel and inter-line intensity derivatives (differences) to be determined during use of my technique.

Although various embodiments of the present invention have been shown and described in detail herein, many other varied embodiments that still incorporate the teachings of the present invention may be easily constructed by those skilled in the art.

INDUSTRIAL APPLICABILITY AND ADVANTAGES

The present invention is useful in systems that scan bit-mapped data and particularly in those systems that scan microfilm containing data strips, either with or without corresponding microfilmed images. The invention advantageously determines the points at which such a data strip should be sampled in order to properly extract bit-mapped data therefrom. In so doing, the invention compensates for horizontal and vertical skew that occurs between the data strip and a line scanner used to mutually scan the data strip and, if it exists, a corresponding microfilmed image.

I claim:

1. A method for determining pixel locations at which a scanned incoming bit-mapped array of pixel values is to be sampled in order to extract values of data bits stored in said array, each of said data bits being formed of at least one pixel in said array, said method comprising the steps of:
    parsing said scanned bit-mapped array into successive strips each having successive rows of pixel values;
    first determining, within each one of said strips, vertical line addresses as a function of inter-row differential intensity values occurring between each pair of successive ones of said rows of pixels in said one strip;
    second determining, within each one of said strips, horizontal pixel addresses as a function of inter-pixel differential intensity values occurring between each pair of successive pixels situated along each one of said rows defined by said vertical line addresses in said one strip; and
    sampling said bit-mapped array at horizontal pixel addresses situated therein and lying on each of said rows defined by said vertical line addresses so as to yield sampled pixel data, whereby said sampled pixel data represents the data bit values stored in said bit-mapped array.

2. The method in claim 1 wherein said pixel values are bi-tonal.

3. The method in claim 2 wherein said bit-mapped array is a data strip recorded on microfilm.

4. The method in claim 3 wherein said data strip is located on the microfilm in the vicinity of and associated with a corresponding microfilmed image.

5. The method in claim 2 further comprising the step of processing an entire row of pixel values in said bit-mapped array at a time, wherein said entire row extends through horizontally adjacent blocks situated across said array and situated in successive corresponding strips.

6. The method in claim 2 wherein said first determining step comprises the step of: generating each one of said vertical line addresses as a vertical pixel position of a first mid-point situated approximately halfway between ones of said vertical line addresses associated with each corresponding pair of local peak values in said differential inter-row intensity values, said corresponding pair of peak values having a first local peak value of a pre-determined first polarity followed by a second local peak value of a polarity opposite to that of said first polarity.

7. The method in claim 6 wherein said corresponding pair of local peak values comprises a local positive peak value followed by a local negative peak value, or a local negative peak value followed by a local positive peak value.

8. The method in claim 7 wherein said local positive peak value and said local negative peak value exceed respective first and second pre-defined threshold values.

9. The method in claim 6 wherein said first determining step further comprises the step of:
    forming said inter-row differential intensity values by the steps of:
    summing pixel intensity values across each one of said rows to form a series of intensity value sums; and
    determining a difference between each one of said intensity value sums and a next successive one of said intensity value sums to yield a corresponding one of said inter-row differential intensity values;
    or by the steps of:
    determining pixel intensity differences between two vertically aligned pixels in each successive pair of adjacent ones of said rows; and
    combining said intensity differences at successive horizontal pixel positions extending across said strip in order to generate a corresponding one of said inter-row differential intensity differences for each one of said rows.

10. The method in claim 6 wherein said second determining step comprises the step of: generating said horizontal pixel addresses as horizontal pixel positions associated with second mid-points, wherein each successive one of said second mid-points is located approximately halfway between a corresponding successive pair of adjacent local peak values in said inter-pixel differential intensity values.

11. The method in claim 10 wherein all of said adjacent local peak values in said inter-pixel differential intensity values have a common polarity.

12. The method in claim 10 wherein said second determining step further comprises the steps of:
    for each block in said strip, wherein said block extends horizontally across said strip and vertically occupies a plurality of said rows in said strip and a plurality of vertically successive blocks forms said strip:
    determining a difference in intensity values between each pair of horizontally adjacent pixels in each of said each rows in said block to yield an array of inter-pixel differential intensity values for said block;

summing absolute values of said inter-pixel differential values in said array of differential values for each column of vertically aligned pixels in said block to yield a series of absolute valued differential values; and generating said horizontal pixel addresses as horizontal pixel positions associated with said second mid-points, wherein each successive one of said second mid-points is located approximately halfway between a corresponding successive pair of adjacent local positive peak values in said absolute valued differential values.

13. The method in claim 2 wherein said second determining step comprises the step of: generating said horizontal pixel addresses as horizontal pixel positions associated with second mid-points, wherein each successive one of said second mid-points is located approximately halfway between a corresponding successive pair of adjacent local peak values in said inter-pixel differential intensity values.

14. The method in claim 13 wherein all of said adjacent local peak values in said inter-pixel differential intensity values have a common polarity.

15. The method in claim 14 wherein said second determining step further comprises the steps of:

for each block in said strip, wherein said block extends horizontally across said strip and vertically occupies a plurality of said rows in said strip and a plurality of vertically successive blocks forms said strip:

determining a difference in intensity values between each pair of horizontally adjacent pixels in each of said each rows in said block to yield an array of inter-pixel differential intensity values for said block;

summing absolute values of said inter-pixel differential values in said array for each column of vertically aligned pixels in said block to yield a series of absolute valued differential values; and generating said horizontal pixel addresses as horizontal pixel positions associated with said second mid-points, wherein each successive one of said second mid-points is located approximately halfway between a corresponding successive pair of adjacent local positive peak values in said absolute valued differential values.

16. A method for determining pixel locations at which a scanned incoming microfilm data strip of bi-tonal pixel values is to be sampled in order to extract values of bi-tonal data bits stored in said data strip, each of said data bits being formed of at least one pixel in said data strip, said method comprising the steps of:

parsing said scanned data strip into successive strips each having successive rows of pixel values;

first determining, within each one of said strips, vertical line addresses as a function of inter-row differential intensity values occurring between each pair of successive ones of said rows of pixels in said one strip;

second determining, within each one of said strips, horizontal pixel addresses as a function of inter-pixel differential intensity values occurring between each pair of successive pixels situated along each one of said rows defined by said vertical line addresses in said one strip; and sampling said data strip at horizontal pixel addresses situated therein and lying on each of said rows defined by said vertical line addresses so as to yield sampled pixel data, whereby said sampled pixel data represents the data bit values stored in said data strip.

17. The method in claim 16 wherein said first determining step comprises the step of: generating each one of said vertical line addresses as a vertical pixel position of a first mid-point situated approximately halfway between ones of said vertical line addresses associated with each corresponding pair of local peak values in said differential inter-row intensity values, said corresponding pair of peak values having a first local peak value of a pre-determined first polarity followed by a second local peak value of a polarity opposite to that of said first polarity.

18. The method in claim 17 wherein said corresponding pair of local peak values comprises a local positive peak value followed by a local negative peak value, or a local negative peak value followed by a local positive peak value.

19. The method in claim 18 wherein said local positive peak value and said local negative peak value exceed respective first and second pre-defined threshold values.

20. The method in claim 17 wherein said first determining step further comprises the step of:

forming said inter-row differential intensity values by the steps of:

summing pixel intensity values across each one of said rows to form a series of intensity value sums; and determining a difference between each one of said intensity value sums and a next successive one of said intensity value sums to yield a corresponding one of said inter-row differential intensity values; or by the steps of:

determining pixel intensity differences between two vertically aligned pixels in each successive pair of adjacent ones of said rows; and combining said intensity differences at successive horizontal pixel positions extending across said strip in order to generate a corresponding one of said inter-row differential intensity differences for each one of said rows.

21. The method in claim 16 wherein said second determining step comprises the step of: generating said horizontal pixel addresses as horizontal pixel positions associated with second mid-points, wherein each successive one of said second mid-points is located approximately halfway between a corresponding successive pair of adjacent local peak values in said inter-pixel differential intensity values.

22. The method in claim 21 wherein all of said adjacent local peak values in said inter-pixel differential intensity values have a common polarity.

23. The method in claim 22 wherein said second determining step further comprises the steps of:

for each block in said strip, wherein said block extends horizontally across said strip and vertically occupies a plurality of said rows in said strip and a plurality of vertically successive blocks forms said strip:

determining a difference in intensity values between each pair of horizontally adjacent pixels in each of said each rows in said block to yield an array of inter-pixel differential intensity values for said block;

summing absolute values of said inter-pixel differential values in said array for each column of vertically aligned pixels in said block to yield a series of absolute valued differential values; and generating said horizontal pixel addresses as horizontal pixel positions associated with said second mid-points, wherein each successive one of said second mid-points is located approximately halfway between a corresponding successive pair of adjacent local positive peak values in said absolute valued differential values.

24. Apparatus for determining pixel locations at which a scanned incoming microfilm data strip of bi-tonal pixel values is to be sampled in order to extract values of bi-tonal data bits stored in said data strip, each of said data bits being formed of at least one pixel in said data strip, said apparatus comprising:

means for parsing said scanned data strip into successive strips each having successive rows of pixel values;

first means, responsive to said parsing means, for determining, within each one of said strips, vertical line addresses as a function of inter-row differential intensity values occurring between each pair of successive ones of said rows of pixels in said one strip;

second means, responsive to said first means and to said scanned data strip, for determining horizontal pixel addresses as a function of inter-pixel differential intensity values occurring between each pair of successive pixels situated along each one of said rows defined by said vertical line addresses in said one strip; and means, responsive to said first and second determining means, for sampling said data strip at horizontal pixel addresses situated therein and lying on each of said rows defined by said vertical line addresses so as to yield sampled pixel data, whereby said sampled pixel data represents the data bit values stored in said data strip.

25. The apparatus in claim 24 wherein said first determining means comprises: means for generating each one of said vertical line addresses as a vertical pixel position of a first mid-point situated approximately halfway between ones of said vertical line addresses associated with each corresponding pair of local peak values in said differential inter-row intensity values, said corresponding pair of peak values having a first local peak value of a pre-determined first polarity followed by a second local peak value of a polarity opposite to that of said first polarity.

26. The apparatus in claim 25 wherein said corresponding pair of local peak values co...prises a local positive peak value followed by a local negative peak value, or a local negative peak value followed by a local positive peak value.

27. The apparatus in claim 26 wherein said local positive peak value and said local negative peak value exceed respective first and second pre-defined threshold values.

28. The apparatus in claim 25 wherein said first determining step further comprises:

means for summing pixel intensity values across each one of said rows to form a series of intensity value sums; and means for determining a difference between each one of said intensity value sums and a next successive one of said intensity value sums to yield a corresponding one of said inter-row differential intensity values; or means for determining pixel intensity differences between two vertically aligned pixels in each successive pair of adjacent ones of said rows; and means for combining said intensity differences at successive horizontal pixel positions extending across said strip in order to generate a corresponding one of said inter-row differential intensity differences for each one of said rows.

29. The apparatus in claim 24 wherein said second determining means comprises: means for generating said horizontal pixel addresses as horizontal pixel positions associated with second mid-points, wherein each successive one of said second mid-points is located approximately halfway between a corresponding successive pair of adjacent local peak values in said inter-pixel differential intensity values.

30. The apparatus in claim 29 wherein all of said adjacent local peak values in said inter-pixel differential intensity values have a common polarity.

31. The apparatus in claim 30 wherein said second determining means further comprises:

means for determining a difference in intensity values between each pair of horizontally adjacent pixels in each of said each rows in each one of a plurality of vertically successive blocks to yield an array of inter-pixel differential intensity values for said block, wherein each of said blocks extends horizontally across said strip and vertically occupies a plurality of said rows therein and said plurality of blocks forms said strip;

means for summing absolute values of said inter-pixel differential values in said array for each column of vertically aligned pixels in said block to yield a series of absolute valued differential values; and means for generating said horizontal pixel addresses as horizontal pixel positions associated with said second mid-points, wherein each successive one of said second mid-points is located approximately halfway between a corresponding successive pair of adjacent local positive peak values in said absolute valued differential values.

* * * * *